United States Patent
Shrivastava et al.

(10) Patent No.: US 10,989,976 B2
(45) Date of Patent: Apr. 27, 2021

(54) COMMISSIONING WINDOW NETWORKS

(71) Applicant: View, Inc., Milpitas, CA (US)

(72) Inventors: Dhairya Shrivastava, Los Altos, CA (US); Stephen Clark Brown, San Mateo, CA (US)

(73) Assignee: View, Inc., Milpitas, CA (US)

( * ) Notice: Subject to any disclaimer, the term of this patent is extended or adjusted under 35 U.S.C. 154(b) by 144 days.

(21) Appl. No.: 15/727,258

(22) Filed: Oct. 6, 2017

(65) Prior Publication Data
US 2018/0088432 A1 Mar. 29, 2018
US 2019/0049811 A9 Feb. 14, 2019

Related U.S. Application Data

(63) Continuation-in-part of application No. 14/391,122, filed on Oct. 7, 2014, now Pat. No. 10,365,531, and
(Continued)

(51) Int. Cl.
*G02F 1/153* (2006.01)
*G02F 1/03* (2006.01)
(Continued)

(52) U.S. Cl.
CPC ............. *G02F 1/163* (2013.01); *G05B 15/02* (2013.01); *G05B 19/042* (2013.01);
(Continued)

(58) Field of Classification Search
CPC .......... G02F 1/155; G02F 1/0316; G02F 3/16; G02F 1/163; G02F 1/1523; G02F 1/1525;
(Continued)

(56) References Cited

U.S. PATENT DOCUMENTS 7,610,910 B2   11/2009   Ahmed
7,966,078 B2   6/2011    Hoffberg et al.
(Continued)

FOREIGN PATENT DOCUMENTS

CN   1808505 A    7/2006
CN   101013211 A  8/2007
(Continued)

OTHER PUBLICATIONS

U.S. Appl. No. 62/102,515, filed Jan. 12, 2015, Nagar et al.
(Continued)

*Primary Examiner* — Dawayne Pinkney
(74) *Attorney, Agent, or Firm* — Weaver Austin Villeneuve & Sampson LLP; Brian D. Griedel

(57) ABSTRACT

Methods are described for the commissioning of optically switchable window networks. During commissioning, network addresses are paired with the locations of installed devices for components on a window network. Commissioning may also involve steps of testing and validating the network devices. By correctly pairing the location of a device with its network address, a window network is configured to function such that controls sent over the network reach their targeted device(s) which in turn respond accordingly. The methods described herein may reduce frustrations that result from mispairing and installation issues that are common to conventional commissioning practices. Commissioning may involve recording a response to a manually or automatically initiated trigger. Commissioning methods described herein may rely on user input, or be automatic, not requiring user input.

24 Claims, 18 Drawing Sheets

Related U.S. Application Data a continuation-in-part of application No. 14/887,178, filed on Oct. 19, 2015, now Pat. No. 10,001,691, which is a continuation of application No. 14/468,778, filed on Aug. 26, 2014, now Pat. No. 9,442,341, which is a continuation of application No. 13/479,137, filed on May 23, 2012, now Pat. No. 9,128,346, which is a continuation of application No. 13/049,750, filed on Mar. 16, 2011, now Pat. No. 8,213,074, application No. 15/727,258, which is a continuation-in-part of application No. 14/951,410, filed on Nov. 24, 2015, now Pat. No. 10,303,035, and a continuation-in-part of application No. PCT/US2017/020805, filed on Mar. 3, 2017, and a continuation-in-part of application No. 15/123,069, filed as application No. PCT/US2015/019031 on Mar. 5, 2015.

(60) Provisional application No. 61/624,175, filed on Apr. 13, 2012, provisional application No. 61/974,677, filed on Apr. 3, 2014, provisional application No. 62/426,126, filed on Nov. 23, 2016, provisional application No. 62/551,649, filed on Aug. 29, 2017, provisional application No. 62/085,179, filed on Nov. 26, 2014, provisional application No. 62/305,892, filed on Mar. 9, 2016, provisional application No. 62/370,174, filed on Aug. 2, 2016, provisional application No. 61/948,464, filed on Mar. 5, 2014.

(51) Int. Cl.

| | |
|---|---|
| *G02F 1/15* | (2019.01) |
| *G09G 3/19* | (2006.01) |
| *G09G 3/38* | (2006.01) |
| *H04N 9/16* | (2006.01) |
| *G02F 1/163* | (2006.01) |
| *G05B 15/02* | (2006.01) |
| *G05B 19/042* | (2006.01) |
| *G06F 3/0484* | (2013.01) |
| *E06B 9/24* | (2006.01) |
| *E06B 3/67* | (2006.01) |

(52) U.S. Cl.
CPC .............. *E06B 3/6722* (2013.01); *E06B 9/24* (2013.01); *E06B 2009/2464* (2013.01); *G02F 2203/01* (2013.01); *G06F 3/04847* (2013.01)

(58) Field of Classification Search
CPC ........ G02F 1/1521; G02F 1/1533; G02F 1/03; C09K 9/02; B60R 1/088; H04N 9/3137; H04N 9/22
USPC ................. 359/265–275, 277, 245–247, 242; 345/49, 105, 107; 250/70; 348/814, 817; 438/929; 349/182–186
See application file for complete search history.

(56) References Cited

U.S. PATENT DOCUMENTS

| | | |
|---|---|---|
| 8,024,073 B2 | 9/2011 | Imes et al. |
| 8,214,494 B1 | 7/2012 | Slavin |
| 8,509,400 B2 | 8/2013 | Liu et al. |
| 8,705,162 B2 | 4/2014 | Brown et al. |
| 8,764,950 B2 | 7/2014 | Wang et al. |
| 9,470,947 B2 | 10/2016 | Nagel et al. |
| 9,546,515 B2 | 1/2017 | Hall et al. |
| 10,365,531 B2 | 7/2019 | Shrivastava et al. |
| 2002/0113168 A1 | 8/2002 | Rukavina et al. |
| 2002/0152298 A1 | 10/2002 | Kikta et al. |
| 2005/0063036 A1 | 3/2005 | Bechtel et al. |
| 2005/0200937 A1 | 9/2005 | Weidner |
| 2006/0001683 A1 | 1/2006 | May et al. |
| 2007/0053053 A1 | 3/2007 | Moskowitz |
| 2007/0067048 A1* | 3/2007 | Bechtel ............... E06B 9/24 700/19 |
| 2007/0097484 A1 | 5/2007 | Libretto et al. |
| 2008/0018979 A1 | 1/2008 | Mahe et al. |
| 2009/0257576 A1 | 10/2009 | Wellard et al. |
| 2010/0066484 A1 | 3/2010 | Hanwright et al. |
| 2010/0172009 A1 | 7/2010 | Matthews |
| 2011/0148218 A1 | 6/2011 | Rozbicki |
| 2011/0184561 A1 | 7/2011 | Klasson et al. |
| 2012/0062975 A1 | 3/2012 | Mehtani et al. |
| 2012/0232969 A1 | 9/2012 | Fadell et al. |
| 2012/0293855 A1 | 11/2012 | Shrivastava et al. |
| 2013/0085614 A1 | 4/2013 | Wenzel et al. |
| 2013/0157493 A1 | 6/2013 | Brown et al. |
| 2013/0271812 A1 | 10/2013 | Brown et al. |
| 2013/0271814 A1 | 10/2013 | Brown |
| 2013/0271815 A1 | 10/2013 | Brown et al. |
| 2014/0108647 A1* | 4/2014 | Bleess ............... H04L 67/10 709/224 |
| 2014/0236323 A1 | 8/2014 | Brown et al. |
| 2014/0317514 A1* | 10/2014 | Bokotey ............... G06F 3/0481 715/736 |
| 2015/0002919 A1 | 1/2015 | Jack et al. |
| 2015/0070745 A1 | 3/2015 | Pradhan |
| 2015/0103389 A1 | 4/2015 | Klawuhn et al. |
| 2015/0116811 A1 | 4/2015 | Shrivastava et al. |
| 2016/0052446 A1 | 2/2016 | Frey et al. |
| 2016/0054633 A1 | 2/2016 | Brown et al. |
| 2016/0154290 A1 | 6/2016 | Brown et al. |
| 2016/0299210 A1 | 10/2016 | Zeine |
| 2016/0377948 A1 | 12/2016 | Rozbicki et al. |
| 2017/0075183 A1 | 3/2017 | Brown |
| 2017/0082903 A1 | 3/2017 | Vigano et al. |
| 2019/0294018 A1 | 9/2019 | Shrivastava et al. |
| 2020/0080364 A1 | 3/2020 | Shrivastava et al. |
| 2020/0310213 A1 | 10/2020 | Shrivastava et al. |

FOREIGN PATENT DOCUMENTS

| | | |
|---|---|---|
| CN | 101023711 A | 8/2007 |
| CN | 101213788 A | 7/2008 |
| CN | 103649826 | 3/2014 |
| CN | 104335595 A | 2/2015 |
| CN | 105143586 A | 12/2015 |
| EP | 0920210 A1 | 6/1999 |
| EP | 0676058 B1 | 4/2003 |
| JP | 2004-505298 A | 2/2004 |
| RU | 2378672 C2 | 10/2010 |
| RU | 2009132962 A | 10/2010 |
| TW | 201351010 A | 12/2013 |
| TW | 201606409 A | 2/2016 |
| WO | WO02/09338 A2 | 1/2002 |
| WO | WO02/13052 A2 | 2/2002 |
| WO | WO2009/042359 A1 | 4/2009 |
| WO | WO2010/120771 | 10/2010 |
| WO | WO2013/090264 | 6/2013 |
| WO | WO2013/155467 | 10/2013 |
| WO | WO2015/134789 | 9/2015 |
| WO | WO2015/168626 | 11/2015 |
| WO | WO2015/171886 A1 | 11/2015 |
| WO | WO2016/004109 A1 | 1/2016 |
| WO | WO2016/094445 | 6/2016 |
| WO | WO2017/059362 | 4/2017 |
| WO | WO2017/075059 | 5/2017 |
| WO | WO2017/155833 | 9/2017 |
| WO | WO2017/189618 | 11/2017 |
| WO | WO2017/192881 | 11/2017 |
| WO | WO2018/098089 | 5/2018 |
| WO | WO2018/200740 | 11/2018 |
| WO | WO2018/200752 | 11/2018 |

OTHER PUBLICATIONS

U.S. Appl. No. 62/102,516, filed Jan. 12, 2015, Nagel et al.
U.S. Office Action dated Nov. 18, 2016 in U.S. Appl. No. 14/391,122.

(56) References Cited

OTHER PUBLICATIONS

U.S. Final Office Action dated Jul. 3, 2017 in U.S. Appl. No. 14/391,122.
U.S. Office Action dated Sep. 1, 2017 in U.S. Appl. No. 14/391,122.
European (extended) Search Report dated Dec. 4, 2015 in European Application No. 13775052.7.
International Search Report and Written Opinion dated Jul. 26, 2013, issued in PCT/US2013/036456.
International Preliminary Report on Patentability dated Oct. 23, 2014 issued in PCT/US2013/036456.
Russian Office Action dated Mar. 9, 2017 in RU Application No. 2014145565.
Chinese Office Action dated Jun. 21, 2017 in CN Application No. 201380025802.1.
U.S. Final Office Action dated Feb. 8, 2018 in U.S. Appl. No. 14/391,122.
U.S. Office Action dated Jun. 22, 2018 in U.S. Appl. No. 14/391,122.
U.S. Final Office Action dated Nov. 20, 2018 in U.S. Appl. No. 14/391,122.
U.S. Notice of Allowance dated Mar. 11, 2019 in U.S. Appl. No. 14/391,122.
Chinese Office Action dated Jan. 15, 2018 in CN Application No. 201380025802.1.
Indian Office Action dated Sep. 17, 2019 in Indian Application No. 2533/KOLNP/2014.
International Search Report and Written Opinion dated Jun. 5, 2017, issued in PCT/US17/20805.
International Preliminary Report on Patentability dated Sep. 20, 2018, issued in PCT/US17/20805.
European (extended) Search Report dated Nov. 28, 2019 in European Application No. 17763804.6.
European (Extended) Search Report dated Aug. 25, 2017 in European Application No. 17156033.7.
U.S. Appl. No. 16/082,793, filed Sep. 6, 2018, Shrivastava et al.
U.S. Preliminary Amendment dated Jan. 23, 2020 in U.S. Appl. No. 16/469,848.
International Search Report and Written Opinion dated Apr. 13, 2018 for PCT/US2017/066486.
International Preliminary Report on Patentability dated Jun. 27, 2019 for PCT/US2017/066486.
Chinese Office Action dated May 20, 2020 in CN Application No. 201810932986.4.
Chinese Office Action dated May 26, 2020 in CN Application No. 201780079165.4.
U.S. Notice of Allowance dated Sep. 30, 2020 in U.S. Appl. No. 16/082,793.
Chinese Office Action dated May 26, 2020 for 201780082949.2.
European (Extended) Search Report dated Nov. 2, 2020 in European Application No. 17880595.8.
U.S. Appl. No. 63/109,306, filed Nov. 3, 2020, Marquez et al.

\* cited by examiner

LOC ID:   East1        East2        East3        East4        East5
CAN ID: _____    _____    _____    _____    _____
LITE ID: _____   _____    _____    _____    _____

NC₁

CAN ID: XXXX1
LITE ID: YYYY1          LOC ID_____

⋮

CAN ID: XXXXm
LITE ID: YYYYm         LOC ID_____

*Figure 5E*

LOC ID:  East1     East2     East3     East4     East5
CAN ID: _____   _____   _____   _____   XXXX1
LITE ID: _____   _____   _____   _____   YYYY1

$NC_1$

CAN ID: XXXX1   LOC ID: East 5
LITE ID: YYYY1
· 
· 
· 
· 
· 
· 
CAN ID: XXXXm   LOC ID _____
LITE ID: YYYYm

|   | A | B | C | D | E | F |
|---|---|---|---|---|---|---|
| 1 |   |   |   |   |   |   |
| 2 |   | Group 1 |   |   | Group 2 |   |
| 3 |   |   |   |   |   |   |
| 4 |   |   |   |   |   |   |
| 5 |   | Group 3 |   |   | Group 4 |   |
| 6 |   |   |   |   |   |   |

Full 6x6 facade divided into 4 3x3 groups

*Figure 6C*

|   | A | B | C | D | E | F |
|---|---|---|---|---|---|---|
| 1 | 0 | 1 | 2 | 7 | 6 | 5 |
| 2 | 3 | 4 | 5 | 8 | 2 | 4 |
| 3 | 6 | 7 | 8 | 3 | 1 | 0 |
| 4 | 1 | 2 | 5 | 6 | 5 | 4 |
| 5 | 6 | 3 | 4 | 7 | 2 | 0 |
| 6 | 7 | 8 | 0 | 8 | 3 | 1 |

Pattern # from 0-8 assigned in each group

*Figure 6D*

|   | A | B | C | D | E | F |
|---|---|---|---|---|---|---|
| 1 | 00 | 01 | 02 | 21 | 20 | 12 |
| 2 | 10 | 11 | 12 | 22 | 02 | 11 |
| 3 | 20 | 21 | 22 | 10 | 01 | 00 |
| 4 | 01 | 02 | 12 | 20 | 12 | 11 |
| 5 | 20 | 10 | 11 | 21 | 02 | 00 |
| 6 | 21 | 22 | 00 | 22 | 10 | 01 |

Pattern # converted to base 3

*Figure 6E*

COMMISSIONING WINDOW NETWORKS

CROSS-REFERENCE

This application claims benefit of U.S. Provisional Patent Application No. 62/426,126, filed Nov. 23, 2016, and U.S. Provisional Patent Application No. 62/551,649, filed Aug. 29, 2017, both of which are titled "AUTOMATED COMMISSIONING OF CONTROLLERS IN A WINDOW NETWORK" and are incorporated herein in their entirety and for all purposes. This application is a continuation-in-part of U.S. patent application Ser. No. 14/391,122, titled "APPLICATIONS FOR CONTROLLING OPTICALLY SWITCHABLE DEVICES," filed on Apr. 12, 2013, which claims benefit of U.S. Provisional Patent Application No. 61/624,175, filed on Apr. 13, 2012, both of which are hereby incorporated by reference in their entirety for all purposes. This application is also a continuation-in-part of U.S. patent application Ser. No. 14/951,410, titled "SELF-CONTAINED EC IGU," filed on Nov. 24, 2015, which claims benefit of U.S. Provisional Patent Application No. 62/085,179, filed Nov. 26, 2014, both of which are hereby incorporated by reference in their entirety for all purposes. This application is also a continuation-in-part of PCT Patent Application No. PCT/US17/20805 designating the United States, titled "METHOD OF COMMISSIONING ELECTROCHROMIC WINDOWS," and filed on Mar. 3, 2017, which claims benefit of U.S. Provisional Patent Application No. 62/305,892, filed Mar. 9, 2016, and U.S. Provisional Patent Application No. 62/370,174, filed Aug. 2, 2016, all of which are hereby incorporated by reference in their entirety for all purposes. This application is also a continuation-in-part of U.S. patent application Ser. No. 15/123,069, titled "MONITORING SITES CONTAINING SWITCHABLE OPTICAL DEVICES AND CONTROLLERS," filed on Sep. 1, 2017, which is the national stage application of PCT Application PCT/US15/19031, which was filed on Mar. 5, 2015, which claims benefit of U.S. Provisional Application No. 61/948,464, filed on Mar. 5, 2014, and U.S. Provisional Application No. 61/974,677, filed on May 3, 2014, all of which are hereby incorporated herein in their entirety for all purposes. This application is also a continuation-in-part of U.S. patent application Ser. No. 14/887,178 (now U.S. Pat. No. 10,001,691), titled "ONBOARD CONTROLLERS FOR MULTISTATE WINDOWS," filed on Oct. 19, 2015, which is a continuation of U.S. patent application Ser. No. 14/468,778 (now U.S. Pat. No. 9,442,341), titled "ONBOARD CONTROLLER FOR MULTISTATE WINDOWS," filed on Aug. 26, 2014, which is a continuation of U.S. application Ser. No. 13/479,137 (now U.S. Pat. No. 9,128,346), titled "ONBOARD CONTROLLER FOR MULTISTATE WINDOWS," filed on May 23, 2012, which is a continuation of U.S. patent application Ser. No. 13/049,750 (now U.S. Pat. No. 8,213,074), titled "ONBOARD CONTROLLER FOR MULTISTATE WINDOWS," filed on Mar. 16, 2011.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance.

Electrochromic materials may be incorporated into, for example, windows for home, commercial and other uses as thin film coatings on the window glass. The color, transmittance, absorbance, and/or reflectance of such windows may be changed by inducing a change in the electrochromic material, for example, electrochromic windows are windows that can be darkened or lightened electronically. A small voltage applied to an electrochromic device of the window will cause them to darken; reversing the voltage polarity causes them to lighten. This capability allows control of the amount of light that passes through the windows, and presents an opportunity for electrochromic windows to be used as energy-saving devices.

While electrochromism was discovered in the 1960's, electrochromic devices, and particularly electrochromic windows, still, unfortunately, suffer various problems and have not begun to realize their full commercial potential despite many recent advancements in electrochromic technology, apparatus and related methods of making and/or using electrochromic devices. For example, there remain issues with commissioning electrochromic windows and associated electrochromic window network devices.

SUMMARY

One aspect of the present disclosure pertains to a method of commissioning windows in a building, the method includes operations of (a) identifying networked devices for commissioning, where the networked devices include a first window located in the building; (b) receiving user input from a remote device to check functioning of the first window; (c) testing the functioning of the first window according to the input; and (d) determining from the testing that the first window is malfunctioning or misidentified.

Testing the functioning of the first window may include sending instructions from the remote device to the first window to change a tint state of the first window. In some cases, the tint state of the first window is one of two or more available tint states for the window.

In some cases, determining in (d) includes determining that an ID of the first window matches a physical location of the first window. In some cases, receiving user input includes receiving information from a graphical user interface (GUI) on the remote device, where the GUI is configured to receive input identifying locations of the windows in the building.

In some cases, identifying networked devices for commissioning includes determining an ID of the first window from installation data that specifies locations of windows in the building. In some cases, user instructions may be received from the remote device to group the first window with a second window of the building. Further instructions may, in some cases, be received to change a tint state of the first window and a tint state of the second window.

In some cases, identifying networked devices for commissioning includes (a) receiving a prepared list of networked devices to be commissioned; (b) the execution a discovery routine that discovers networked devices that have not yet been commissioned; and/or (c) discovering the locations of networked devices within the building.

In some cases, a notification of an event triggering commissioning may be presented through a user interface of the remote device (which may be a handheld device such as a smartphone or tablet).

Another aspect of the present disclosure relates to a method of commissioning windows in a building that includes operations of (a) identifying networked devices for commissioning, where each networked device has an ID, and where the networked devices include a first window located in the building; (b) determining the location of each networked device; and (c) pairing the determined location with the ID for each networked device, to thereby allow network communication with networked devices at their determined locations.

In some cases, the determined location of each networked device is determined via analysis of wireless electromagnetic signals received or broadcast from the networked device. The wireless electromagnetic signals may include ultra-wideband signals. In some cases, the analysis of the wireless electromagnetic signals provides a determined location with an accuracy of less than about 10 cm. In some cases, commissioning is done automatically without requiring user input.

In some cases, the location of each networked device is determined via observing the location of a trigger or a trigger response.

Another aspect of the present disclosure pertains to a system of networked devices in a building having (a) one or more network controllers; (b) a plurality of window controllers, each configured to control a tint state for one or more optically switchable windows in a building, where each of the window controllers is in communication with one of the one or more network controllers; and (c) a master controller in communication with each of the network controllers and a remote device. The master controller is configured to (i) identify networked devices for commissioning, where the networked devices include a first window controller in the building; (ii) receive user input from a remote device to check function of the first window controller; (iii) test the functioning of the first window controller according to the input; and (iv) determine, from the testing, that the first window is malfunctioning or misidentified.

In some embodiments, the master controller is further configured to determine that the ID of the first window matches a physical location of the first window. In some embodiments, the master controller may be configured to receive user instructions from the remote device to group the first window with a second window of the building. The master controller may also be configured to receive instructions to change a tint state of the first window and a tint state of the second window.

In some embodiments, the master controller is further configured to notify a user, through a user interface of the remote device, of an event triggering commissioning.

BRIEF DESCRIPTION OF THE DRAWINGS

FIG. 5E depicts an example of a graphical user interface that may be used for commissioning electrochromic windows using the method of FIG. 5A.

FIG. 5G depicts another example of a graphical user interface that may be used for commissioning electrochromic windows using the method of FIG. 5A.

FIG. 6B depicts a set of electrochromic windows during three different tint steps as described in relation to FIG. 6A.

FIGS. 6C-6E depict a set of electrochromic windows and relevant information about such windows during a method in which the association between window controllers and their associated electrochromic windows is determined.

DETAILED DESCRIPTION

The following detailed description is directed to certain embodiments or implementations for the purposes of describing the disclosed aspects. However, the teachings herein can be applied and implemented in a multitude of different ways. In the following detailed description, references are made to the accompanying drawings. Although the disclosed implementations are described in sufficient detail to enable one skilled in the art to practice the implementations, it is to be understood that these examples are not limiting; other implementations may be used and changes may be made to the disclosed implementations without departing from their spirit and scope. Furthermore, while the disclosed embodiments focus on electrochromic windows (also referred to as optically switchable windows, smart windows, and insulated glass units), the concepts disclosed herein may apply to other types of optically switchable devices including, for example, liquid crystal devices and suspended particle devices, among others. For example, a liquid crystal device or a suspended particle device, rather than an electrochromic device, could be incorporated into some or all of the disclosed implementations. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C" and "A, B and C." Further, as used herein, the terms pane, lite, and substrate are used interchangeably to refer to the surfaces, e.g. glass, where an electrochromic device is placed on or the surfaces of an insulated glass unit ("IGU"). An electrochromic window may be in the form of a laminate structure, an IGU, or both, i.e., where an IGU includes two or more substantially transparent substrates, or two panes of glass, where at least one of the substrates includes an electrochromic device disposed thereon, and the substrates have a spacer, or separator, disposed between them. One or more of these substrates may itself be a structure having multiple substrates, e.g., two or more sheets of glass. An IGU is typically hermetically sealed, having an interior region that is isolated from the ambient environment. A window assembly may include an IGU, electrical connectors and related wiring, e.g., a pigtail, for coupling the one or more electrochromic devices of the IGU to a window controller, and a frame that supports the IGU. A window assembly may also include a window controller as described herein, and/or components of a window controller, e.g., a dock.

I. General Electrochromic Device Structure

Figure 1:
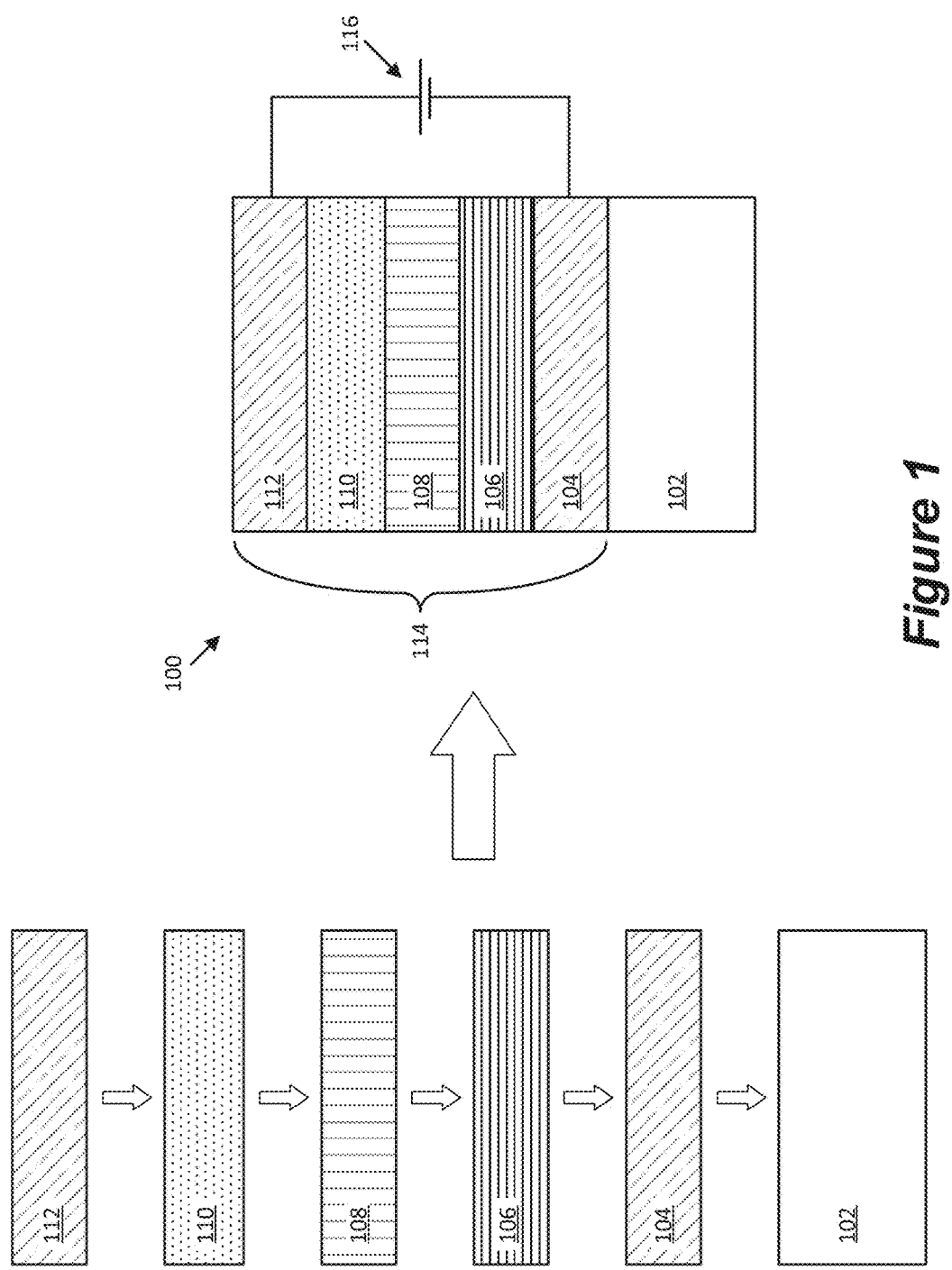
FIG. 1 is a schematic cross-section depicting conventional formation of an electrochromic device stack.

To understand the specifics of commissioning, the general electrochromic device structure, electrochromic windows, and electrochromic window networks must be discussed. FIG. 1 depicts a conventional electrochromic device 100 disposed on a substrate 102. Device 100 includes, in the following order starting from the substrate, a first conductive layer 104, a first electrochromic layer (EC1) 106, ion conductor (IC) material 108, a second electrochromic layer (EC2) 110, and a second conductive layer 112. Components 104, 106, 108, 110, and 112 are collectively referred to as an electrochromic stack 114. In certain embodiments, the transparent conductor layers are made of a transparent material such as a transparent conductive oxide, which may be referred to as a "TCO." Since the TCO layers are transparent, the tinting behavior of the EC1-IC-EC2 stack is observable through the TCO layers, for example, allowing use of such devices on a window for reversible shading. A voltage source 116, operable to apply an electric potential across electrochromic stack 114, effects the transition of the electrochromic device from, for example, a clear state (i.e., transparent or bleached) to a tinted state (i.e., colored). In certain embodiments, the electrochromic device does not include distinct ion conductor material. See U.S. Pat. No. 8,764,950 issued Jul. 1, 2014, and PCT Publication No. WO2015/168626, field May 1, 2015, both of which are incorporated herein by reference in their entireties.

In conventional devices such as those depicted in FIG. 1 as well as in certain devices of this disclosure, one of the first and second electrochromic layers is typically a cathodically tinting layer and the other is an anodically tinting layer. In such embodiments, the first and second electrochromic layers will tint when exposed to opposite polarities. For example, the first electrochromic layer may tint under an applied cathodic potential (and clear under an applied anodic potential), while the second electrochromic layer may tint under an applied anodic potential (and clear under an applied cathodic potential). Of course, the arrangement can be reversed for some applications. Either way, the first and second electrochromic layers work in concert to tint and clear.

In some embodiments, one of the first and second electrochromic layers can be substituted with a non-electrochromic ion storage layer. In such cases, only one of the two layers exhibits electrochromism such that it tints and clears under application of suitable potentials. The other layer, sometimes referred to as a counter electrode layer, simply serves as an ion reservoir when the other layer is exposed to a cathodic potential.

While FIG. 1 depicts a general electrochromic device structure, the structure is not meant to be limiting. For example, while FIG. 1 depicts a device stack having distinct layers, electrochromic stacks may be graded structures or may include additional components such as an antenna structure. While most of the discussion in the present disclosure focuses on windows having electrochromic devices, the disclosure more generally pertains to windows having any type of optically switchable device such as liquid crystal devices and suspended particle devices.

II. Window Controllers

Window controllers as described herein may have many sizes, formats, and locations with respect to the optically switchable windows they control. Typically the controller will be attached to glass of an IGU or laminate but may be in a frame that houses the IGU or laminate. An electrochromic window may include one, two, three or more individual electrochromic panes (an electrochromic device on a transparent substrate). Also, an individual pane of an electrochromic window may have an electrochromic coating that has independently tintable zones. A controller as described herein can control all electrochromic coatings associated with such windows, whether the electrochromic coating is monolithic or zoned. While window controllers are described as being associated with a single window, in some cases, a window controller may control more than one optically switchable window.

The controller is generally configured in close proximity to the electrochromic window, generally adjacent to, on the glass or inside an IGU, within a frame of the self-contained assembly, for example. In some embodiments, the window controller is an "in situ" controller; that is, the controller is part of a window assembly, an IGU or a laminate, and may not have to be matched with the electrochromic window, and installed, in the field, e.g., the controller travels with the window as part of the assembly from the factory. The controller may be installed in the window frame of a window assembly, or be part of an IGU or laminate assembly, for example, mounted on or between panes of the IGU or on a pane of a laminate. In some embodiments, a localized controller may be provided as more than one part, with at least one part (e.g., including a memory component storing information about the associated electrochromic window) being provided as a part of the window assembly and at least one other part being separate and configured to mate with the at least one part that is part of the window assembly, IGU or laminate. In certain embodiments, a controller may be an assembly of interconnected parts that are not in a single housing, but rather spaced apart, e.g., in the secondary seal of an IGU. In other embodiments the controller is a compact unit, e.g., in a single housing or in two or more components that combine, e.g., a dock and housing assembly, that is proximate the glass, not in the viewable area, or mounted on the glass in the viewable area.

In one embodiment, the controller is incorporated into or onto the IGU and/or the window frame prior to installation of the electrochromic window. In one embodiment, the controller is incorporated into or onto the IGU and/or the window frame prior to leaving the manufacturing facility. In one embodiment, the controller is incorporated into the IGU, substantially within the secondary seal. In another embodiment, the controller is incorporated into or onto the IGU, partially, substantially, or wholly within a perimeter defined by the primary seal between the sealing separator and the substrate.

Having the controller as part of an IGU and/or a window assembly, the IGU can possess logic and features of the controller that, e.g., travels with the IGU or window unit. For example, when a controller is part of the IGU assembly, in the event the characteristics of the electrochromic device(s) change over time (e.g., through degradation), a characterization function can be used, for example, to update control parameters used to drive tint state transitions. In another example, if already installed in an electrochromic window unit, the logic and features of the controller can be used to calibrate the control parameters to match the intended installation, and for example if already installed, the control parameters can be recalibrated to match the performance characteristics of the electrochromic pane(s).

In other embodiments, a particular controller is not pre-associated with a window, but rather a dock component, e.g., having parts generic to any electrochromic window, is associated with each window at the factory. After window installation, or otherwise in the field, a second component of the controller is combined with the dock component to complete the electrochromic window controller assembly. The dock component may include a chip which is programmed at the factory with the physical characteristics and parameters of the particular window to which the dock is attached (e.g., on the surface which will face the building's interior after installation, sometimes referred to as surface 4 or "S4"). The second component (sometimes called a "carrier," "casing," "housing," or "controller") is mated with the dock, and when powered, the second component can read the chip and configure itself to power the window according to the particular characteristics and parameters stored on the chip. In this way, the shipped window need only have its associated parameters stored on a chip, which is integral with the window, while the more sophisticated circuitry and components can be combined later (e.g., shipped separately and installed by the window manufacturer after the glazier has installed the windows, followed by commissioning by the window manufacturer). Various embodiments will be described in more detail below. In some embodiments, the chip is included in a wire or wire connector attached to the window controller. Such wires with connectors are sometimes referred to as pigtails.

As used herein, the term outboard means closer to the outside environment, while the term inboard means closer to the interior of a building. For example, in the case of an IGU having two panes, the pane located closer to the outside environment is referred to as the outboard pane or outer pane, while the pane located closer to the inside of the building is referred to as the inboard pane or inner pane. The different surfaces of the IGU may be referred to as S1, S2, S3, and S4 (assuming a two-pane IGU). S1 refers to the exterior-facing surface of the outboard lite (i.e., the surface that can be physically touched by someone standing outside). S2 refers to the interior-facing surface of the outboard lite. S3 refers to the exterior-facing surface of the inboard lite. S4 refers to the interior-facing surface of the inboard lite (i.e., the surface that can be physically touched by someone standing inside the building). In other words, the surfaces are labeled S1-S4, starting from the outermost surface of the IGU and counting inwards. In cases where an IGU includes three panes, this same trend holds (with S6 being the surface that can be physically touched by someone standing inside the building). In certain embodiments employing two panes, the electrochromic device (or other optically switchable device) is disposed on S3.

Further examples of window controllers and their features are presented in U.S. Provisional Patent Application No. 62/248,181, filed Oct. 29, 2015, and titled "METHOD OF COMMISSIONING ELECTROCHROMIC WINDOWS," and U.S. Provisional Patent Application No. 62/305,892, filed Mar. 9, 2016, and titled "METHOD OF COMMISSIONING ELECTROCHROMIC WINDOWS," each of which is herein incorporated by reference in its entirety.

III. Window Controller Networks

Figure 2A:
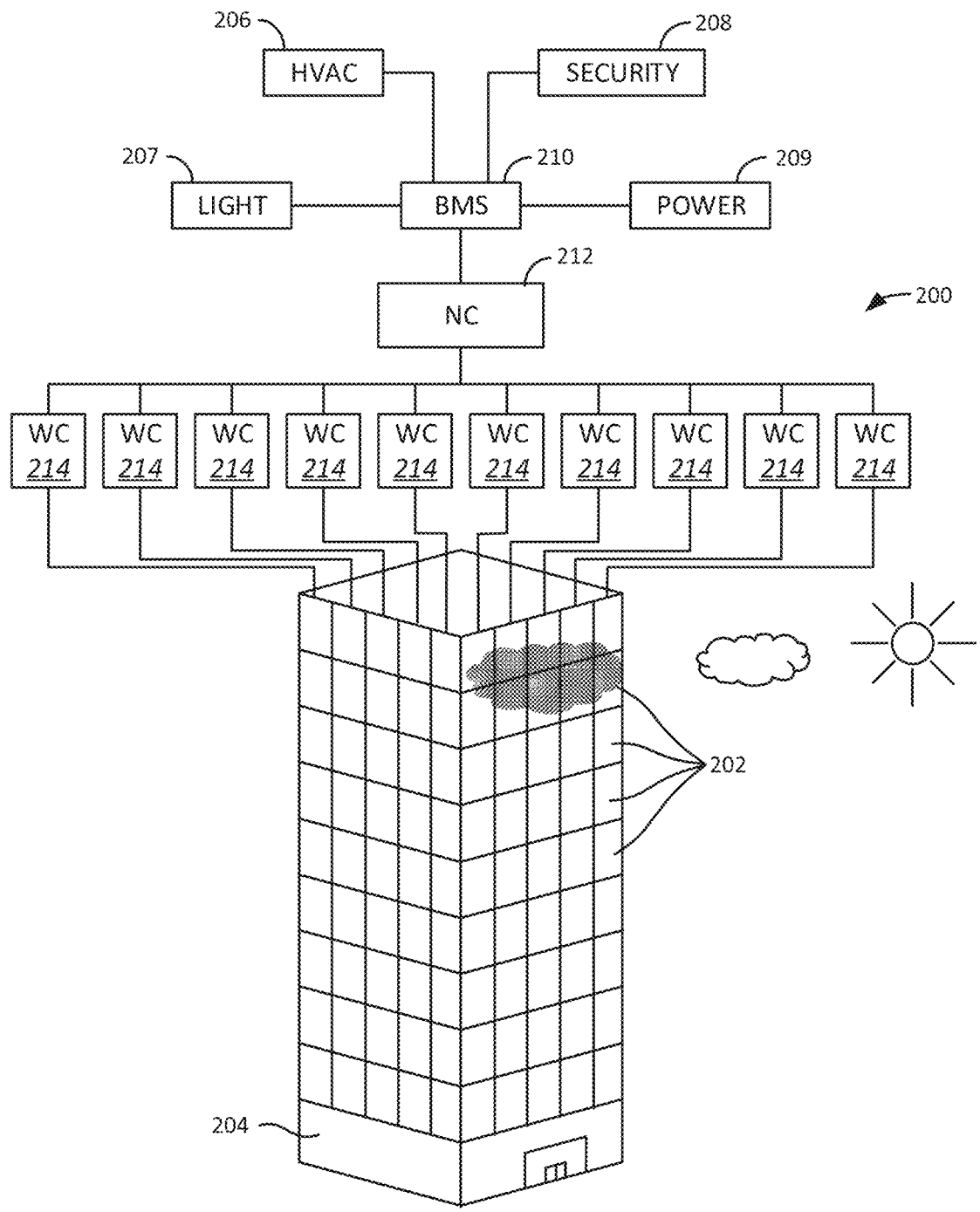
FIG. 2A shows a depiction of an example system for controlling and driving a plurality of electrochromic windows.

FIG. 2A shows a depiction of an example system or network 200 for controlling and driving a plurality of electrochromic windows 202. It may also be employed to control the operation of one or more devices associated with an electrochromic window such as a window antenna. The system 200 can be adapted for use with a building 204 such as a commercial office building or a residential building. In some implementations, the system 200 is designed to function in conjunction with modern heating, ventilation, and air conditioning (HVAC) systems 206, interior lighting systems 207, security systems 208 and power systems 209 as a single holistic and efficient energy control system for the entire building 204, or a campus of buildings 204. Some implementations of the system 200 are particularly well-suited for integration with a building management system (BMS) 210. The BMS 210 is a computer-based control system that can be installed in a building to monitor and control the building's mechanical and electrical equipment such as HVAC systems, lighting systems, power systems, elevators, fire systems, and security systems. The BMS 210 can include hardware and associated firmware or software for maintaining conditions in the building 204 according to preferences set by the occupants or by a building manager or other administrator. The software can be based on, for example, internet protocols or open standards.

A BMS can typically be used in large buildings where it functions to control the environment within the building. For example, the BMS 210 can control lighting, temperature, carbon dioxide levels, and humidity within the building 204. There can be numerous mechanical or electrical devices that are controlled by the BMS 210 including, for example, furnaces or other heaters, air conditioners, blowers, and vents. To control the building environment, the BMS 210 can turn on and off these various devices according to rules or in response to conditions. Such rules and conditions can be selected or specified by a building manager or administrator, for example. One primary function of the BMS 210 is to maintain a comfortable environment for the occupants of the building 204 while minimizing heating and cooling energy losses and costs. In some implementations, the BMS 210 can be configured not only to monitor and control, but also to optimize the synergy between various systems, for example, to conserve energy and lower building operation costs.

Some implementations are alternatively or additionally designed to function responsively or reactively based on feedback sensed through, for example, thermal, optical, or other sensors or through input from, for example, an HVAC or interior lighting system, or an input from a user control. Further information may be found in U.S. Pat. No. 8,705,162, issued Apr. 22, 2014, which is incorporated herein by reference in its entirety. Some implementations also can be utilized in existing structures, including both commercial and residential structures, having traditional or conventional HVAC or interior lighting systems. Some implementations also can be retrofitted for use in older residential homes.

The system 200 includes a network controller 212 configured to control a plurality of window controllers 214. For example, the network controller 212 can control tens, hundreds, or even thousands of window controllers 214. Each window controller 214, in turn, can control and drive one or more electrochromic windows 202. In some implementations, the network controller 212 issues high-level instructions such as the final tint state of an electrochromic window and the window controllers receive these commands and directly control their windows by applying electrical stimuli to appropriately drive tint state transitions and/or maintain tint states. The number and size of the electrochromic windows 202 that each window controller 214 can drive is generally limited by the voltage and current characteristics of the load on the window controller 214 controlling the respective electrochromic windows 202. In some implementations, the maximum window size that each window controller 214 can drive is limited by the voltage, current, or power requirements to cause the desired optical transitions in the electrochromic window 202 within a desired timeframe. Such requirements are, in turn, a function of the surface area of the window. In some implementations, this relationship is nonlinear. For example, the voltage, current, or power requirements can increase nonlinearly with the surface area of the electrochromic window 202. For example, in some cases the relationship is nonlinear at least in part because the sheet resistance of the first and second conductive layers 214 and 216 (see, for example, FIG. 2A) increases nonlinearly with distance across the length and width of the first or second conductive layers. In some implementations, the relationship between the voltage, current, or power requirements required to drive multiple electrochromic windows 202 of equal size and shape is, however, directly proportional to the number of the electrochromic windows 202 being driven.

Figure 2B:
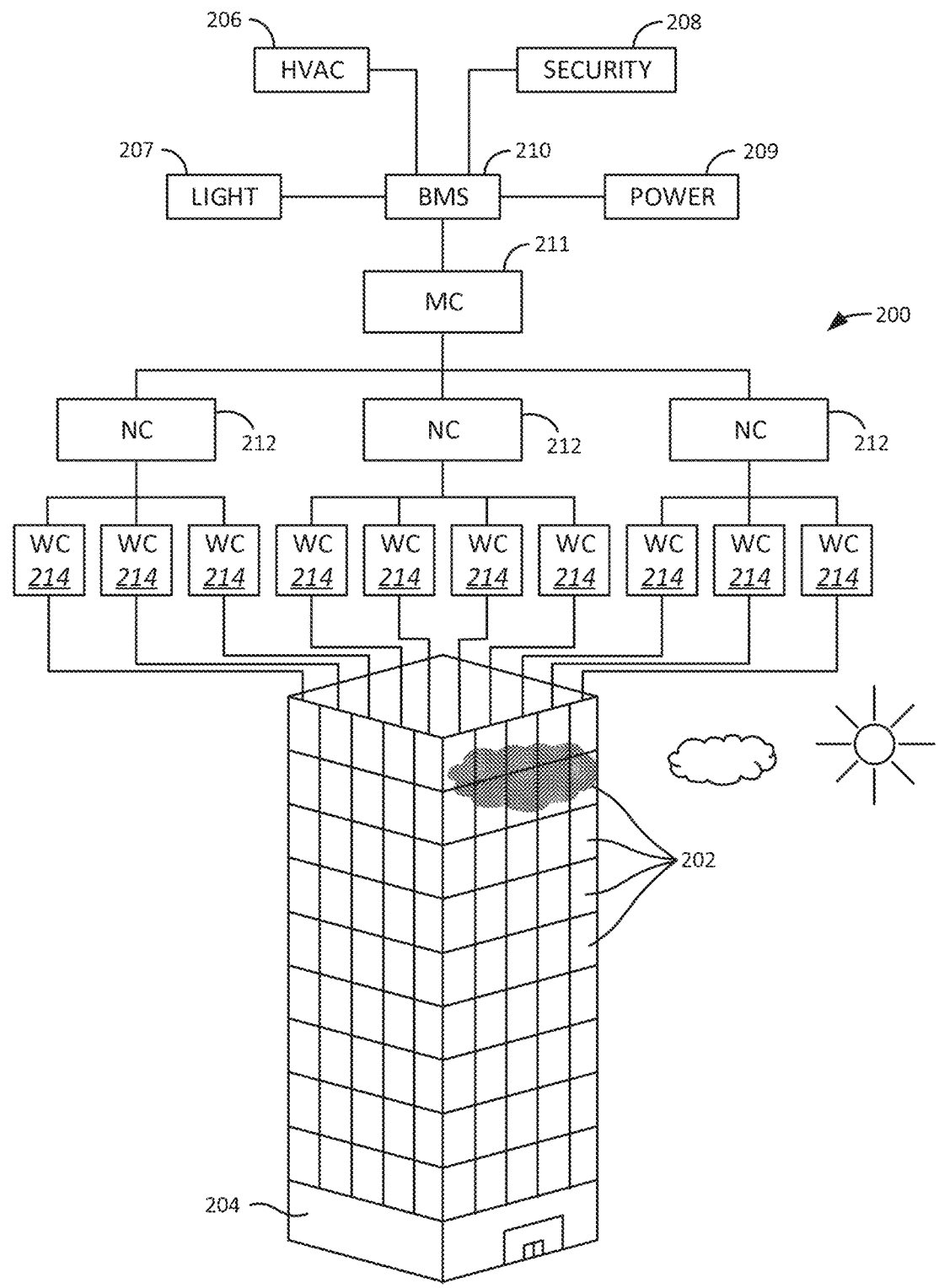
FIG. 2B shows a depiction of another example system for controlling and driving a plurality of electrochromic windows.

FIG. 2B depicts another example system 200 for controlling and driving a plurality of electrochromic windows 202. The system 200 shown in FIG. 2B is similar to the system 200 shown in FIG. 2A. In contrast to the system of FIG. 2A, the system 200 shown in FIG. 2B includes a master controller 211. The master controller 211 communicates and functions in conjunction with multiple network controllers 212, each of which network controllers 212 is capable of addressing a plurality of window controllers 214 as described with reference to FIG. 2A. In some implementations, the master controller 211 issues the high-level instructions (such as the final tint states of the electrochromic windows) to the network controllers 212, and the network controllers 212 then communicate the instructions to the corresponding window controllers 214.

In some implementations, the various electrochromic windows 202 and/or antennas of the building or other structure are advantageously grouped into zones or groups of zones, each of which includes a subset of the electrochromic windows 202. For example, each zone may correspond to a set of electrochromic windows 202 in a specific location or area of the building that should be tinted (or otherwise transitioned) to the same or similar optical states based on their location. As a more specific example, consider a building having four faces or sides: a North face, a South face, an East face and a West face. Consider also that the building has ten floors. In such a didactic example, each zone can correspond to the set of electrochromic windows 202 on a particular floor and on a particular one of the four faces. In some such implementations, each network controller 212 can address one or more zones or groups of zones. For example, the master controller 211 can issue a final tint state command for a particular zone or group of zones to a respective one or more of the network controllers 212. For example, the final tint state command can include an abstract identification of each of the target zones. The designated network controllers 212 receiving the final tint state command can then map the abstract identification of the zone(s) to the specific network addresses of the respective window controllers 214 that control the voltage or current profiles to be applied to the electrochromic windows 202 in the zone(s).

In embodiments where at least some of the electrochromic windows have antennas, zones of windows for tinting purposes may or may not correspond to zones for antenna-related functions. For example, a master and/or network controller may identify two distinct zones of windows for tinting purposes, e.g. two floors of windows on a single side of a building, where each floor has different tinting algorithms based on customer preferences. In some implementations, zoning is implemented in a hierarchy of three or more tiers; e.g., at least some windows of a building are grouped into zones, and at least some zones are divided into subzones, with each subzone subject to different control logic and/or user access.

Figure 2C:
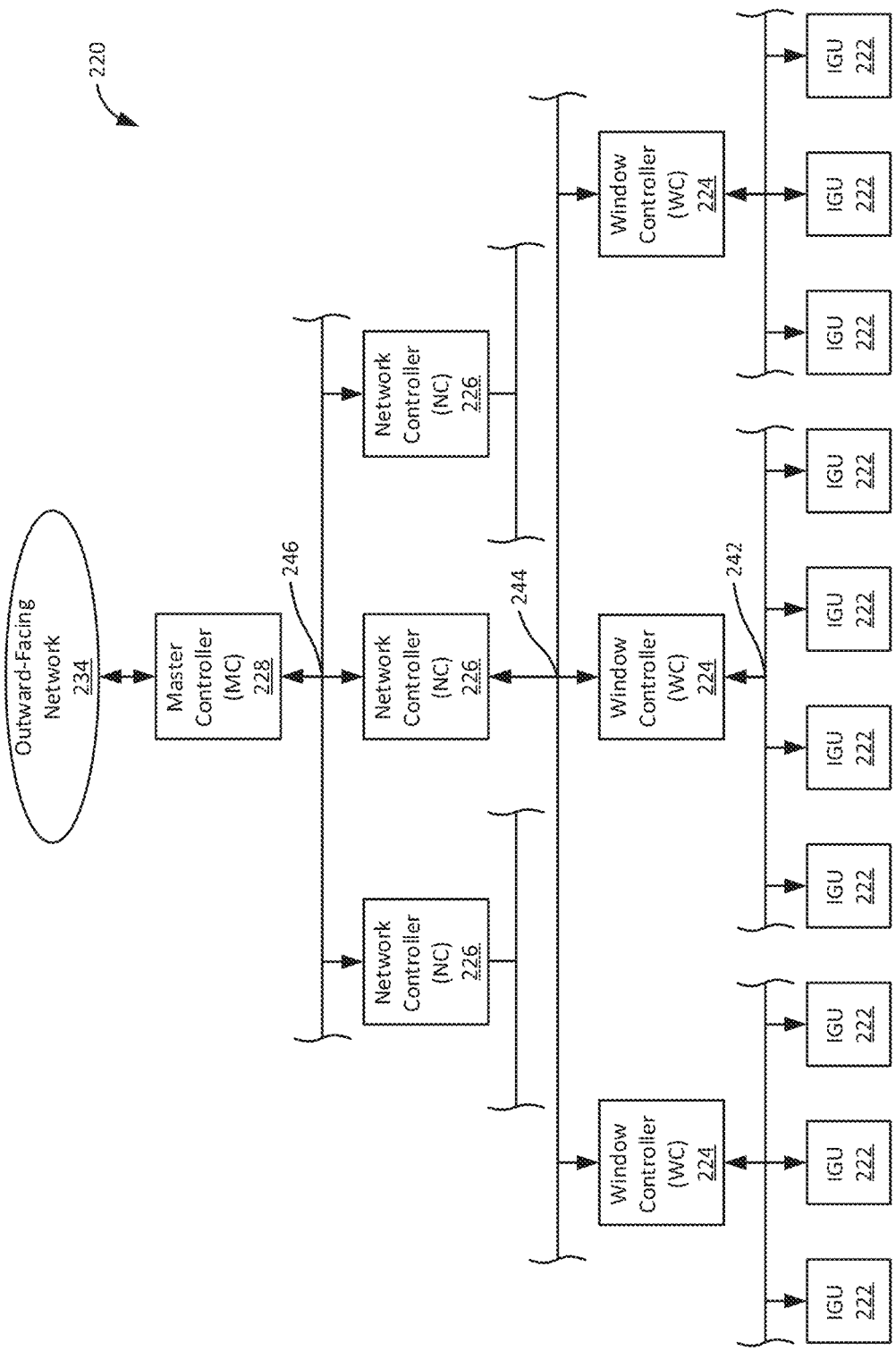
FIG. 2C shows a block diagram of an example network system, operable to control a plurality of IGUs in accordance with some implementations.

In many instances, optically switchable windows can form or occupy substantial portions of a building envelope. For example, the optically switchable windows can form substantial portions of the walls, facades and even roofs of a corporate office building, other commercial building or a residential building. In various implementations, a distributed network of controllers can be used to control the optically switchable windows. FIG. 2C shows a block diagram of an example network system, 220, operable to control a plurality of IGUs 222 in accordance with some implementations. One primary function of the network system 220 is controlling the optical states of the electrochromic devices (or other optically switchable devices) within the IGUs 222. In some implementations, one or more of the windows 222 can be multi-zoned windows, for example, where each window includes two or more independently controllable electrochromic devices or zones. In various implementations, the network system 220 is operable to control the electrical characteristics of the power signals provided to the IGUs 222. For example, the network system 220 can generate and communicate tinting instructions (also referred to herein as "tint commands") to control voltages applied to the electrochromic devices within the IGUs 222.

In some implementations, another function of the network system 220 is to acquire status information from the IGUs 222 (hereinafter "information" is used interchangeably with "data"). For example, the status information for a given IGU can include an identification of, or information about, a current tint state of the electrochromic device(s) within the IGU. The network system 220 also can be operable to acquire data from various sensors, such as temperature sensors, photosensors (also referred to herein as light sensors), humidity sensors, air flow sensors, or occupancy sensors, antennas, whether integrated on or within the IGUs 222 or located at various other positions in, on or around the building.

The network system 220 can include any suitable number of distributed controllers having various capabilities or functions. In some implementations, the functions and arrangements of the various controllers are defined hierarchically. For example, the network system 220 includes a plurality of distributed window controllers (WCs) 224, a plurality of network controllers (NCs) 226, and a master controller (MC) 228. In some implementations, the MC 228 can communicate with and control tens or hundreds of NCs 226. In various implementations, the MC 228 issues high-level instructions to the NCs 226 over one or more wired or wireless links 246 (hereinafter collectively referred to as "link 246"). The instructions can include, for example, tint commands for causing transitions in the optical states of the IGUs 222 controlled by the respective NCs 226. Each NC 226 can, in turn, communicate with and control a number of WCs 224 over one or more wired or wireless links 244 (hereinafter collectively referred to as "link 244"). For example, each NC 226 can control tens or hundreds of the WCs 224. Each WC 224 can, in turn, communicate with, drive or otherwise control one or more respective IGUs 222 over one or more wired or wireless links 242 (hereinafter collectively referred to as "link 242").

The MC 228 can issue communications including tint commands, status request commands, data (for example, sensor data) request commands or other instructions. In some implementations, the MC 228 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application or a combination of such sensor data and such a request). In some implementations, when the MC 228 determines to cause a tint state change in a set of one or more IGUs 222, the MC 228 generates or selects a tint value corresponding to the desired tint state. In some implementations, the set of IGUs 222 is associated with a first protocol identifier (ID) (for example, a BACnet ID). The MC 228 then generates and transmits a communication—referred to herein as a "primary tint command"— including the tint value and the first protocol ID over the link 246 via a first communication protocol (for example, a BACnet compatible protocol). In some implementations, the MC 228 addresses the primary tint command to the particular NC 226 that controls the particular one or more WCs 224 that, in turn, controls the set of IGUs 222 to be transitioned. The NC 226 receives the primary tint command including the tint value and the first protocol ID and maps the first protocol ID to one or more second protocol IDs. In some implementations, each of the second protocol IDs identifies a corresponding one of the WCs 224. The NC 226 subsequently transmits a secondary tint command including the tint value to each of the identified WCs 224 over the link 244 via a second communication protocol. In some implementations, each of the WCs 224 that receives the secondary tint command then selects a voltage or current profile from an internal memory based on the tint value to drive its respectively connected IGUs 222 to a tint state consistent with the tint value. Each of the WCs 224 then generates and provides voltage or current signals over the link 242 to its respectively connected IGUs 222 to apply the voltage or current profile.

Figure 3:
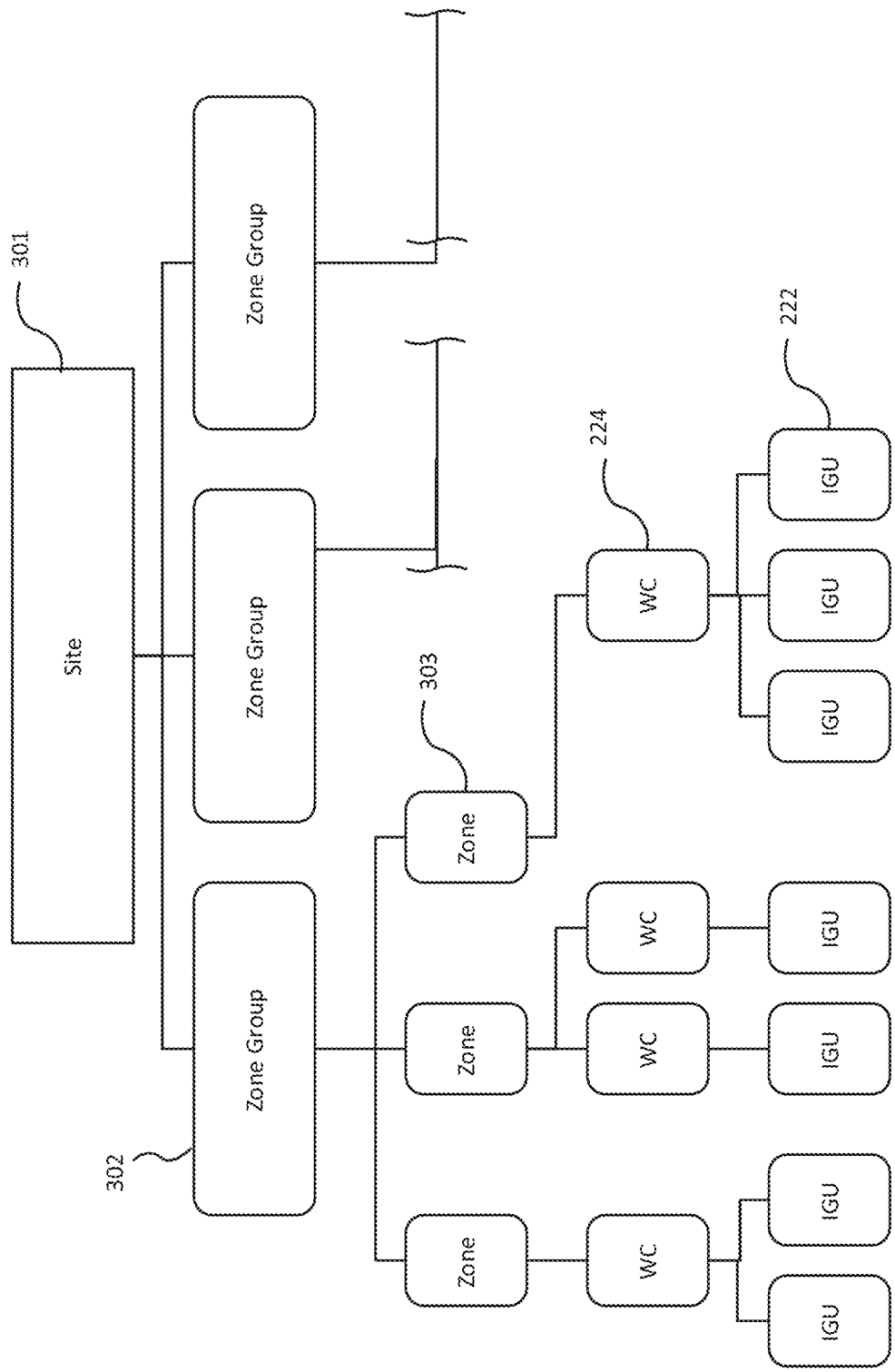
FIG. 3 depicts a hierarchal structure in which IGUs may be arranged.

Similarly to how the function and/or arrangement of controllers may be arranged hierarchically, electrochromic windows may be arranged in a hierarchical structure as shown in FIG. 3. A hierarchical structure helps facilitate the control of electrochromic windows at a particular site by allowing rules or user control to be applied to various groupings of electrochromic windows or IGUs. Further, for aesthetics, multiple contiguous windows in a room or other site location must sometimes need to have their optical states correspond and/or tint at the same rate. Treating a group of contiguous windows as a zone can facilitate these goals.

As suggested above, the various IGUs 222 may be grouped into zones 303 of electrochromic windows, each of which zones 303 includes at least one window controller 224 and its respective IGUs 222. In some implementations, each zone of IGUs 222 is controlled by one or more respective NCs 226 and one or more respective WCs 224 controlled by these NCs 226. In some more specific implementations, each zone 303 can be controlled by a single NC 226 and two or more WCs 224 controlled by the single NC 226. Said another way, a zone 303 can represent a logical grouping of the IGUs 222. For example, each zone 303 may correspond to a set of IGUs 222 in a specific location or area of the building that are driven together based on their location. As a more specific example, consider a site 301 that is a building having four faces or sides: a North face, a South face, an East Face and a West Face. Consider also that the building has ten floors. In such a didactic example, each zone can correspond to the set of electrochromic windows 200 on a particular floor and one of the four faces. Additionally or alternatively, each zone 303 may correspond to a set of IGUs 222 that share one or more physical characteristics (for example, device parameters such as size or age). In some other implementations, a zone 303 of IGUs 222 can be grouped based on one or more non-physical characteristics such as, for example, a security designation or a business hierarchy (for example, IGUs 222 bounding managers' offices can be grouped in one or more zones while IGUs 222 bounding non-managers' offices can be grouped into one or more different zones).

In some such implementations, each NC 226 can address all of the IGUs 222 in each of one or more respective zones 303. For example, the MC 228 can issue a primary tint command to the NC 226 that controls a target zone 303. The primary tint command can include an abstract identification of the target zone ("zone ID"). In some such implementations, the zone ID can be a first protocol ID such as that just described in the example above. In such cases, the NC 226 receives the primary tint command including the tint value and the zone ID and maps the zone ID to the second protocol IDs associated with the WCs 224 within the zone. In some other implementations, the zone ID can be a higher level abstraction than the first protocol IDs. In such cases, the NC 226 can first map the zone ID to one or more first protocol IDs, and subsequently map the first protocol IDs to the second protocol IDs.

When instructions relating to the control of any device (e.g., instructions for a window controller or an IGU) are passed through a network system 220, they are accompanied with a unique network ID of the device they are sent to. Networks IDs (or network addresses) are necessary to ensure that instructions reach and are carried out on the intended device. For example, a window controller that controls the tint states of more than one IGU, determines which IGU to control based upon a network ID such as a CAN ID (a form of network ID) that is passed along with the tinting command. In a window network such as those described herein, the term network ID includes but is not limited to CAN IDs, and BACnet IDs. Such network IDs may be applied to window network nodes such as window controllers 224, network controllers 226 and, master controllers 238. Often when described herein, a network ID for a device includes the network ID of every device that controls it in the hierarchical structure. For example, the network ID of an IGU may include a window controller ID, a network controller ID, and a master controller ID in addition to its CAN ID.

IV. Commissioning Challenges

A challenge presented by electrochromic window technology is commissioning, or the process of associating network addresses with physical locations of specific windows and/or their electrical controllers (window controllers) within a building. In order for electrochromic window tint controls to function properly (i.e., to allow the window control system to change the tint state of one or a set of specific windows or IGUs), a master controller (and/or other controller responsible for tint decisions) may need to know the network address of the window controller(s) connected to that specific window or set of windows.

After a network of electrochromic windows is physically installed, the network may need to be configured so that for each window controller it knows both (i) the physical location of the window controller or an associated window and (ii) the network address of the window controller. In some cases, each window controller may be assigned to a particular window, which may be assigned to a particular location in the building. However, during installation, it is common for a window controller and/or window to be installed incorrectly causing it to operate unexpectedly, or not at all. A typical installation procedure requires following a schematic representing positions of windows in a building and a table specifying installation locations of window controllers identified by network addresses. A master controller uses this same association for controlling the tinting of windows. During installation, the schematic is not always followed accurately for some of the reasons listed here: (a) an installer is unable to locate a window controller with a specific network address at time of installation; (b) a window controller with specific network address has been installed at the wrong location by mistake; (c) a window controller with a specific network address has been damaged; (d) a window controller with a specific network address has been by mistake cross-wired to nearby IGU; and (e) an error occurs in transferring window controller locations from an architectural drawing to the table of network addresses. These installation errors lead to various problems during operation. For example, in the case where a master controller issues a command using a network address for a window controller to tint a window at the desired location (per an installation schematic), an installation error may cause an IGU at a different location to tint (if the window controller has been installed at a wrong location) or an error to be generated (if that specific network address is invalid). All of these installation errors may cause the window network to malfunction and can be difficult and time-consuming to address. Various methods described herein overcome these mispairing and installation issues.

V. Mapping Accomplished with Commissioning

Commissioning is the process that includes assigning the unique network addresses (sometimes referred to as network IDs or CAN IDs of the CAN bus system) of controllers and other devices in an electrochromic window network, with their physical location (sometimes referred to as physical addresses, location IDs, or LOC IDs) in a building or site installation so that the control logic of an electrochromic window network may operate properly. After installation of a window network, a professional or other installation technician may commission the window assemblies by identifying each controller (e.g., each window controller) and associating it with its physical location in the network. The installation technician may utilize a program with a user interface on an electric device such as a phone, tablet, computer, etc. to help commission the windows. An application or program on the electronic device may include a list, directory, and/or map of every device in the network. An installation technician may commission devices on a window network by initiating triggers and observing corresponding responses to pair the network addresses of each device to its physical location. In some cases, a trigger may be associated with a physical location; for instance, a technician may press a button on a window controller which sends a signal over the network with the identification of the control and the window. As a result of this signal, the identification of the triggered window may pop up on the electronic device, allowing the technician to associate the identification of the triggered window controller with its physical location. Alternatively, in other embodiments, a trigger may be associated with the network address of a component; for example, a technician may issue a tint command to a device having a particular network address. Having sent a tint command, the tint state may be observed by the technician and the pairing can be made the physical location associated with the network address.

In some implementations where the program on the electronic device generates (or otherwise utilizes) a map of the windows, this association may be made in a graphical user interface (GUI), e.g., by dragging the triggered identification (e.g., the corresponding network address or ID) onto the map at the appropriate location where a response was observed, or by clicking the map at the appropriate location where a trigger was initiated from (e.g., if the window is triggered via a button). The map may be generated through the mesh network techniques described herein in some embodiments, or the map may be preloaded into the installation technician's computing device using schematics of the installation that are drawn up as part of the building plans, for example. After a first window is associated with its physical location, the installer can trigger additional windows and thereby pairing each window identification to a physical location. Triggers and trigger responses are further described below.

Commissioning may also include associating sensors and other components with their appropriate electrochromic window network components. For example, photosensors, temperature sensors, or occupancy sensors may be associated with one or more window controllers so that the system knows where the sensors are gathering information from and which window controllers and windows may make use of that information.

In some cases, commissioning may take place at the same time when a structure is constructed. In other embodiments, the installation may occur at a later date, e.g., a retrofit application. In some embodiments, commissioning may be implemented in stages, with each stage occurring after a new set of devices is installed in the structure. For example, in a first phase, some electrochromic windows may be installed on a south-facing side of an existing building. These windows and their associated controllers would be commissioned soon after installation. At a later time, additional electrochromic windows and associated controllers are installed on east and west facing sides of the building. These new, later installed windows are then commissioned. Even later, the windows on the north facing side of the building are replaced with electrochromic windows and associated controllers. At this point, a further phase of the commissioning is performed. Perhaps, even later, more sensors, controllers, and or other devices are installed in the building, and these are thereafter commissioned as appropriate. In some embodiments, at any event where commissioning is possible, the application presents a notification through its user interface. The notification may be followed by receipt of user instructions to initiate the commissioning process.

Generally, electrochromic windows are installed as window assemblies in which each assembly includes a window and its associated window controller. Due to the proximity of the window and the window controller within an assembly, the window assembly may be considered as a single unit for commissioning purposes. In such cases, the commissioning of windows, window controllers, and/or window assemblies may refer to the same action, and these terms may be used interchangeably herein. In some cases, a window controller may control the tint state of more than one optically switchable window near or adjacent to the controller. For example, a window controller may have a series of ports (e.g., 2-6 ports) each of which can be used to power a separate electrochromic device. In cases where a window controller only operates windows in unison, such that each the same tint state is applied to each window, the controller and its associated windows may continue to be considered as a single unit having a single network address that is associated with a single location for commissioning purposes. In other cases, a window controller may be configured to independently each of its associated windows. For example, a window controller having four ports may simultaneously have windows assigned to different tint states (e.g., "tint1," "tint2," "tint3," and "tint 4"). In such cases commissioning may additionally include mapping the physical location of each window to a port number of the corresponding controller. Thus instructions sent to a window controller for tinting windows would specify which port (or which window) the tinting command should be applied to.

In some cases, commissioning allows for fingerprints, or parameters such as voltage and current response, window drive and control parameters, communications fidelity, window dimensions, lite or device IDs, of windows, controllers, and sensors, may be detected and cataloged by the network. Alternatively, fingerprints may be taken during manufacturing and shared with the network through wireless communication means, e.g., through the cloud, to aid in the network installation process. In some cases, fingerprints may be stored in a pigtail associated with an IGU, or the electrical connection used to power an IGU, which may include a memory component.

VI. Commissioning Mechanisms

Figure 4:
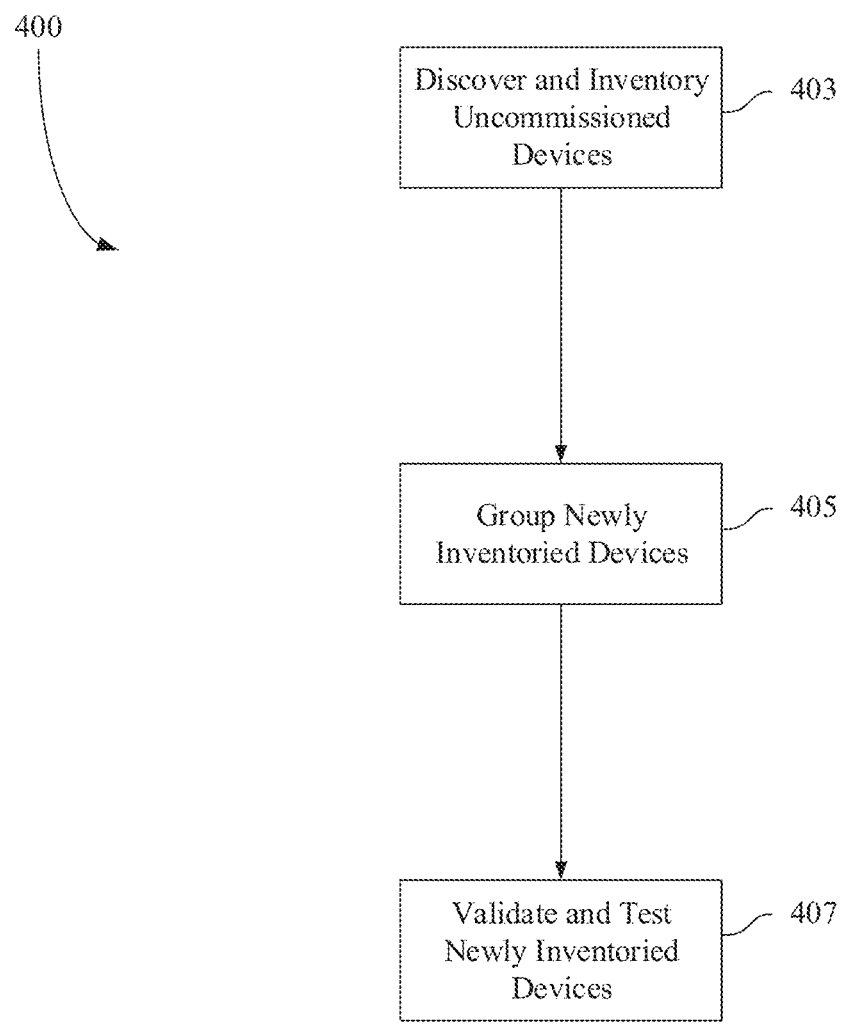
FIG. 4 is a flow chart depicting a commissioning process that may be implemented using a window control application providing an interface on a remote device.

Once the electrochromic window network is installed, a glazier, low-voltage electrician, or other installation technician may initiate the commissioning process. A simple commissioning process 400 according to one embodiment is depicted in FIG. 4. An initial phase of the commissioning involves inventorying (sometimes called "discovering") the un-commissioned devices in a structure. This is depicted in block 403 of FIG. 4. In typical embodiments, the inventorying of devices involves executing a discovery routine of an application that discovers networked devices that have not yet been commissioned. The program used to discover the un-commissioned devices may run on a network server, a remote device, the cloud or some combination of these. Such program may broadcast a discovery request over the network, to which the un-commissioned devices are programmed to respond with certain information about themselves. For example, the devices may respond with their class or type and identification. The identification should uniquely identify each device within a given class or types. Examples of classes or types include an electrochromic window or IGU class, a window controller class, a network controller class, a temperature sensor class, a photosensor class, an occupancy sensor class, a manual override switch class, etc.

In another embodiment, the discovery routine receives a prepared list of the devices to be commissioned. The list may be provided in the form of a table, spreadsheet, database view, etc. Upon receipt of such list, the routine updates an internal list of the available devices under its control.

Examples of ways commissioning can be done include the following:

Method 1 (On-Site Group Creation):

(a) connect all devices and power up; each device identifies itself by device class or type/ID etc. and is then added to the list of that specific device type and can be seen on the user interface.

(b) the user then creates groups via the user interface and adds members by selecting them from the lists created in (a) using drawings/graphics and/or documents containing the grouping information. If needed, the user working with the user interface can confirm that member is physically present in the group's domain by sending a signal and observing the response.

Method 2 (Off-Site Group Creation):

(a) Import a list of all devices as well as groups and possibly other information from a design document or file.

(b) After power-up, the presence of all elements is confirmed (similar to Method 1 for example) and any missing or additional elements are flagged on the application's user interface and subsequently added or deleted by the user.

(c) If needed, the user can confirm that member is physically present in the group's domain by sending a signal and observing the response.

Each of the classes will have certain attributes associative therewith. For example, a class for a photosensor may specify that photosensor provides output in particular increments of foot-candle illuminance. The class may also specify other attributes of the device such as its dynamic range, its manufacturer, its model type, etc. The class may additionally specify information such as a URL or contact for maintenance and replacement details provided by vendors, etc. Further information about classes is presented below in a sample API for a window control application.

The inventorying process may also discover the location of each device within the building. This may involve, for example, uploading installation data specifying the location of each the devices from the most recent installation. As an example, such information may be provided in a spreadsheet, a table, or other arrangement of text. As with the class and ID, the location information may be stored at a location on the window network, on the cloud, on remote devices, or any combination of these. Such configuration information may be created or modified remotely from the location where the devices are located. At an appropriate time, the configuration information is downloaded or otherwise transferred to the window network controller and/or window application for the affected building. This allows the configuration to be performed by an entity, such as a vendor of the optically switchable windows, who does not have access to the network of the building where the windows are installed.

Next, in process 400 of FIG. 4, the inventoried devices may be grouped or zoned as indicated in a block 405, although in some embodiments the inventoried devices need not be grouped. The grouping may be facilitated using the user interface in a remote user application, an application running on a network server, etc. Using the graphical user interface of the window control application, a user may add a new group, modify an existing group, delete a group, combine two or more groups together, create a hierarchy of groups, etc. The user interface makes available through a display or other mechanism all the inventoried devices available for grouping. With this interface, the user identifies one or more devices for inclusion in a defined group.

Device groups may be created for various reasons. Often the devices in a group have one or more attributes in common. In some embodiments, a common attribute is a common location of the devices in the group. In some embodiments, a user or a group of users may be provided access to controlling devices in a group having a common attribute. For example, in multi-tenant buildings tenants may have control of a group corresponding to their portion of the building but not other portions of the building. In some cases, a group that reflects a tenant's space within a building may further be sub-divided into subgroupings of devices within that space.

In many cases, grouping lowers implementation costs. For example, all floors on the same side of the building may be able to leverage a single photo sensor across one or multiple groups. Additionally, grouping may reduce the burden (and reducing complexities) on any upstream BMS system or manual override switch since such entities need to only send commands for groups and not all or some devices in the group.

Further, the grouping may be done in a hierarchical fashion. In other words, a group may belong to higher level group; that is, a low-level group may be a subset of the higher level group. As an example, one group may be limited to optically switchable windows on a north facing side of a building. This "north facing" group may be contained within a higher level group that includes optically switchable windows from all sides of the building, but does not include windows from any other buildings. The "building" is in turn contained within an even higher level group that includes multiple building groups, which each may be part of a building complex, for example. This design has the benefit of allowing the user of a mobile application to quickly identify a problem with a device and only after identifying that a problem exists, spending the effort to determine exactly where the problem resides. For example, a window network administrator for an entire complex of buildings may be able view the device status for the entire super group of devices within the complex.

Grouping is a logical abstraction of the physical network in a window management strategy. It may be n-tier hierarchical, with command-and-control information propagating top-down, and state-and-status information propagating bottom-up.

It should be understood that grouping and modifying groups may be performed outside the context of commissioning. Thus, while a group or groups may be established during commissioning, such group or groups may be modified or deleted long after commissioning has been completed.

Finally, the commissioning process 400 is concluded with a testing and validation phase 407. In this process, all of the inventoried and grouped devices are tested to ensure that they are working and that they are the devices they are shown to be in the inventorying process. In one embodiment, testing and validation are accomplished via a remote device which receives inputs from a user moving around a building from device to device to check the functioning of the devices, which are individually identified on the user application. As part of the testing process, the application may test or trigger individual windows or other devices to determine whether they respond to manual commands issued through the application. The application may also test to determine whether particular sensors are operating as expected. For example, a temperature sensor may be exposed to a heat source, and its output as presented in the application is used to establish that the sensor correctly shows an increasing temperature. If any devices are found to be malfunctioning or to be misrepresented during the testing and validation phase, such devices can be fixed, replaced, and/or re-identified as appropriate. Commissioning devices on the electrochromic window network in this manner confirms that the unique network addresses of components in the electrochromic window network are assigned to their respective physical locations in a building, that the devices are functioning properly, and that windows and their respective controllers and sensors are correctly associated.

Figure 5A:
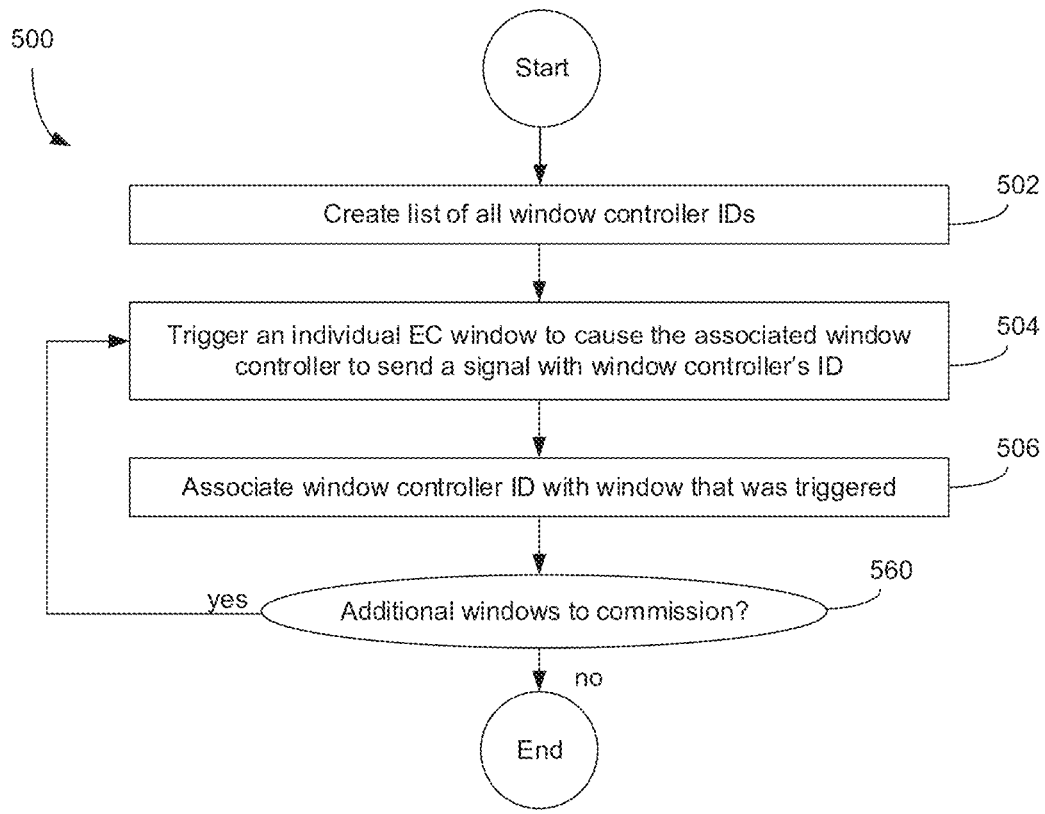
FIG. 5A is a flowchart describing a method of commissioning electrochromic windows.

FIG. 5A is a flowchart depicting a method 500 for commissioning a network of electrochromic windows according to certain embodiments described herein. For example, after all the IGUs have been installed and paired to an associated controller a list of all window controllers (identified by their network IDs) is created. This step is explained further below with reference to FIGS. 5C-5E. After the list of window controllers is generated, an individual window controller is triggered in operation 504. The triggering may occur through any of the methods described herein. This trigger, in some cases, causes the relevant window controller to send a signal with the window controller's network ID. In response, a user can associate the network ID of a triggered window controller with the window's physical location in operation 506. Triggers are further discussed below. Operations 504 and 506 are further explained in the context of FIGS. 5F and 5G. At operation 560, it is determined whether there are additional windows to commission. If there are additional windows to commission, the method repeats from operation 504. The method is complete when all of the windows are commissioned.

Figure 5B:
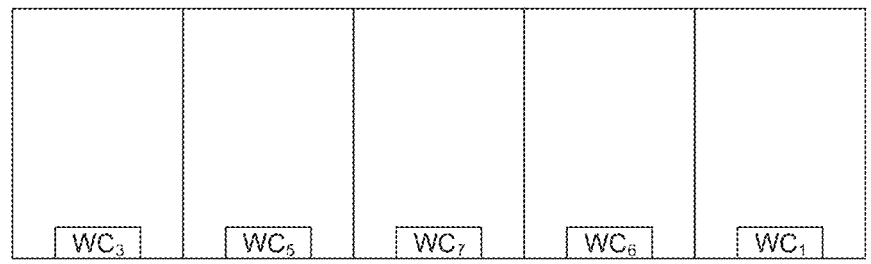
FIG. 5B is a representation of the physical location of a plurality of electrochromic windows that is commissioned in the context of FIGS. 5A-5G.

FIG. 5B presents a representation of the physical location of five electrochromic windows installed on an East wall of a building. The "LOC ID" refers to the location of the relevant window, in this case labeled, arbitrarily, East1-East5. Additional electrochromic windows may be provided elsewhere in the building. The method of FIG. 5A, for example, as explained in relation to FIGS. 5C-5G, may be performed on the set of windows shown in FIG. 5B.

Figure 5C:
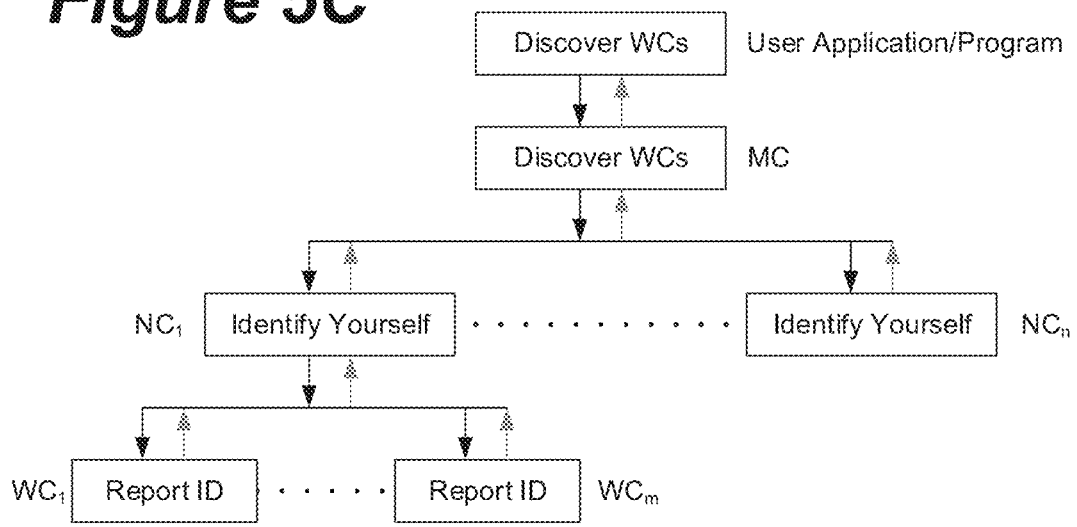
FIG. 5C illustrates in closer detail certain steps that may be taken during the method of FIG. 5A.
Figure 5D:
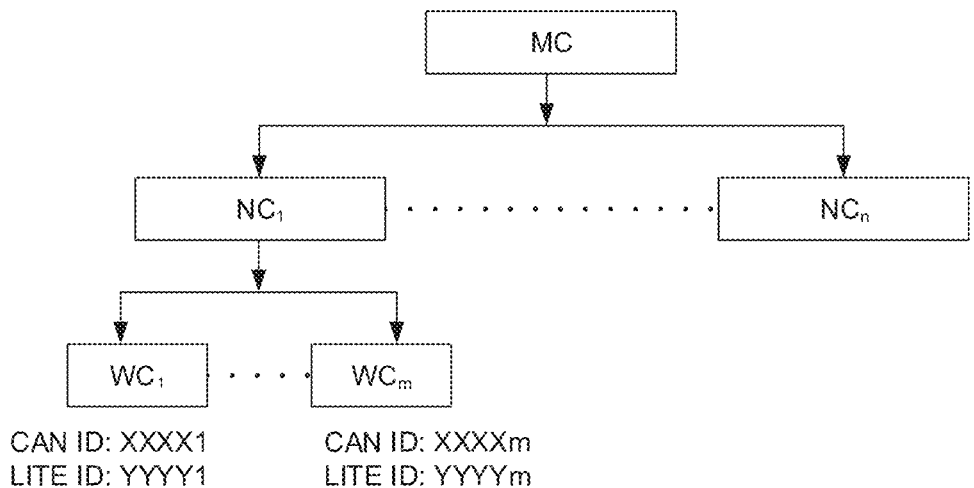
FIG. 5D is a representation of a network of electrochromic windows that may be used in the context of FIGS. 5A-5G.

FIG. 5C illustrates several steps that may be taken during operation 504 of FIG. 5A. In this example, the network of electrochromic windows includes a master controller (MC), two or more network controllers ($NC_1$-$NC_n$), and several window controllers ($WC_1$-$WC_m$). For the sake of clarity, only information relevant to window controllers that operate under the first network controller ($NC_1$) is shown. The dotted lines indicate that many other network controllers and window controllers may be present. First, a user may initiate a command, via a user application/program/etc., to cause the window controllers to be discovered. The user application/program forwards this command to the master controller. The master controller directs the network controllers to discover the window controllers, and the network controllers direct the window controllers to identify themselves. In response, the window controllers report their network IDs to the network controllers, which then report the network IDs of the window and network controllers to the master controller, which reports the network IDs of each controller in the window network to the user application/program. The master controller and/or the user application/program may aggregate this information to create the list of all window controllers. This list may include information detailing which window controllers are controlled by each network controller. The list may also be provided as a chart that shows the configuration of all the relevant controllers on the network, as shown in FIG. 5D. The network representation shown in FIG. 5D may appear on the graphical user interface in some cases.

FIG. 5E depicts an example of user interface features that may be presented to a user after operation 504 is complete, and the list of window controller IDs (e.g., each controller's network ID) is created. On the upper portion of FIG. 5E, a map of the relevant windows is shown. This map may be created by any means available, and in some cases may be specifically programmed for each installation. After operation 504, it is still not known where each window is positioned. Thus, the map does not yet show the CAN ID for any of the window controllers, but rather has empty fields that will be populated with this information during the commissioning process. On the bottom portion of FIG. 5E, a list of the window controller IDs is provided. In some cases, this list may contain the one or more LITE ID that may be associated with each controller. After operation 504, all of the network IDs (the CAN IDs) are generally known, but they have not yet been associated with their physical positions (the LOC IDs). For this reason, the bottom portion of FIG. 5E shows the CAN IDs (and in this particular case, the corresponding LITE IDs) as populated, while the LOC IDs are still blank. A similar list may be provided for each of the different network controllers.

Figure 5F:
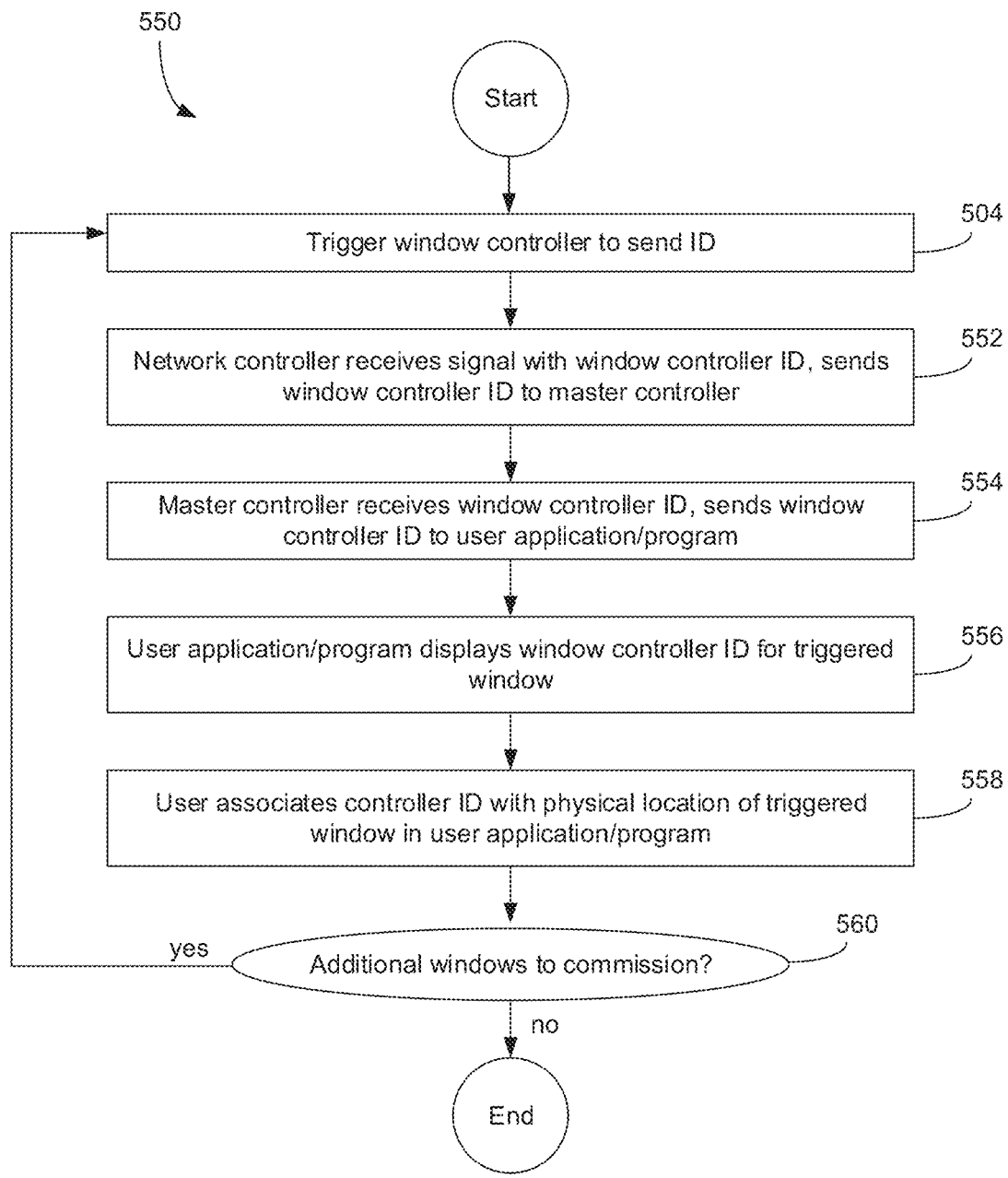
FIG. 5F is a flowchart further explaining certain steps that may occur in the method of FIG. 5A.

FIG. 5F is a flowchart that presents a method 550 for performing operations 504 and 506 from FIG. 5A in more detail, according to one embodiment. In FIG. 5F, the method begins at operation 504, where a user triggers a window controller, thereby causing it to send the window controller ID (e.g., the window controller's network ID) to its associated network controller. The network controller receives the signal with the window controller ID, and sends the window controller ID to the master controller at operation 552. Next, at operation 554, the master controller receives the signal with the window controller ID, and sends the window controller ID to a user application/program/etc. At operation 556, the user application/program displays the window controller ID for the triggered window. Next, at operation 558, the user may associate the window ID of the triggered window with the physical location of the window that was triggered. As described more fully below, various techniques may be employed to detect the physical location of a window controller having a known network address. In one approach, from the list of discovered window controllers for a specific network controller, the network issues a tint command to a specific window controller (assuming all other window controllers are in a clear state). The user may then walk around and identify location(s) at which windows have tinted. At this point, the network address of the window controller gets associated with those window location(s). This process is repeated till all window controllers are associated with window location (s). In another approach, if window controllers are visible, a user may select a window controller from a list of window controllers for a specific network controller and then trigger an action at that window controller. The user then walks around and identifies the physical window location where the window controller light is blinking (or other triggered action is observed). The user then associates that specific location to the network address of the window controller on which action was triggered. In a third approach, when window controllers are accessible, a user goes to a physical window location and triggers a signal through interaction with the window controller (e.g., by pressing a button or triggering a sensor). The master controller then indicates which window controller was triggered and the user can associate it with the physical window location(s).

The user may input the physical location and/or network addresses learned by observing the behavior of windows or window controllers. In one example, the user drags the window ID (e.g., a window controller's network ID) displayed in operation 556 onto the physical location of the triggered window as represented on the map of windows. With reference to FIG. 5E, for instance, a particular window ID (e.g., a CAN ID) may become bold or otherwise noticeable in the user application/program in response to the window controller being triggered. The user can see the bolded window ID and then drag it onto the map at an appropriate location. Conversely, the user may drag the relevant window from the map onto the triggered window ID. Similarly, a user may click on the triggered window ID and click on the relevant window from the map to associate the two. Various methods may be used.

FIG. 5G depicts an example graphical user interface similar to the one shown in FIG. 5E, after the window positioned at East5 has been identified and associated with its relevant window ID/location. As shown in FIG. 5B, the window at East5 has $WC_1$ installed thereon. Therefore, the CAN ID for $WC_1$ (XXXX1) is displayed below the window at the East5 location. In cases where a window controller has been mapped with particular LITE IDs, the corresponding LITE ID may also be shown as depicted. Similarly, as shown in the bottom portion of FIG. 5G, the list of window controller IDs now includes a LOC ID for $WC_1$. The triggering and location/ID association steps can be repeated until all of the windows are identified and associated with their positions within the building. The fact that $WC_1$ was triggered first was chosen merely for the sake of clarity in the figures. The window controllers can be triggered in any order.

Returning to FIG. 5F, at operation 560 it is determined whether there are any additional windows to commission. If not, the method is complete. If there are additional windows to commission, the method repeats on a different window starting at operation 504.

VII. Triggers and Responses: Electrochromic Window Tinting

In order to commission electrochromic windows, glaziers, low-voltage electricians, or other installation technicians must be able to identify which windows respond which stimuli. Triggers are manual or automatic inputs, commands, or other stimuli that are received, detected, or processed by electrochromic window network devices, e.g., windows, controllers, sensors, etc., that cause the devices and/or their associated controller to respond in a manner consistent with the trigger. By issuing triggers and observing trigger responses, electrochromic window network devices may have IDs (e.g., network IDs) and/or physical locations paired with them, which may be a goal of the commissioning process. The association of a network ID and/or position may render the devices ready for use. Triggers and their responses may be carried over the network, e.g., to a network controller and/or to other window controllers, and may be used as steps in generating a map or directory of all the devices on the network.

Commanding electrochromic windows to transition their optical tint states, also sometimes called commissioning states since they help in associating an electrochromic window with its window controller, may be considered a first type of trigger, with the response being the electrochromic windows transitioning their optical tint states. Within this first type of trigger and response, partial or full tint or transition commands and patterns of tint states are contemplated.

Figure 6A:
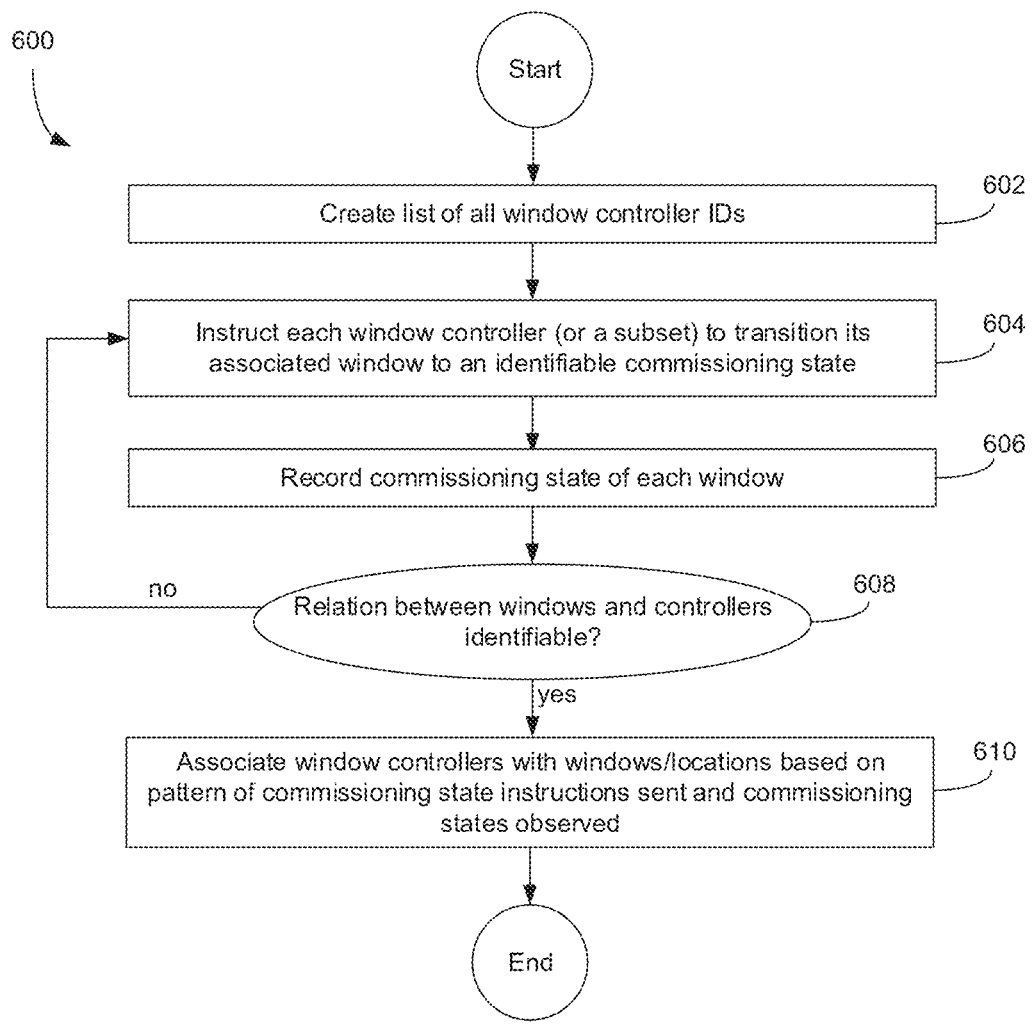
FIG. 6A is a flowchart illustrating a method of determining the association between window controllers and their associated electrochromic windows.

FIG. 6A presents a flowchart for a method 600 for commissioning electrochromic windows according to some implementations. This example assumes that each window controller controls a single associated electrochromic window (though this is not always the case, as discussed further below). At operation 602, a list of every window controller ID (e.g., every controller's network address) is created either manually or automatically. In some cases, the installed window controllers are polled to provide their unique IDs and associated information. The results may be provided in a database, spreadsheet, or table with location information yet to be determined. By knowing the quantity and unique identifiers for a number of window controllers associated with a set of windows, each window also having a unique identifier, methods described herein allow for identifying which window controllers control which windows in the installation.

In some embodiments, during operation 602 physical information about the IGUs (e.g. window size, aspect ratio, etc.) may also be determined. This information may not be needed in the commissioning processes, but may be useful for other aspects of the window network such as creating a graphical user interface. Determining this information may be done by reading the information stored on the pigtail, or by associating the LITE ID label stored on a pigtail with a database (on the local machine or cloud based, for instance) which has the window information. This information can speed up the IGU discovery process as described below.

Next, at operation 604, each window controller is instructed to transition its associated window(s) to one of several identifiable commissioning states. In some embodiments, a commissioning state may be a single (relatively static) tint state. For instance, tint states such as "tint1," "tint3," "tint 4," etc. may each be used as commissioning states.

Figure 7:
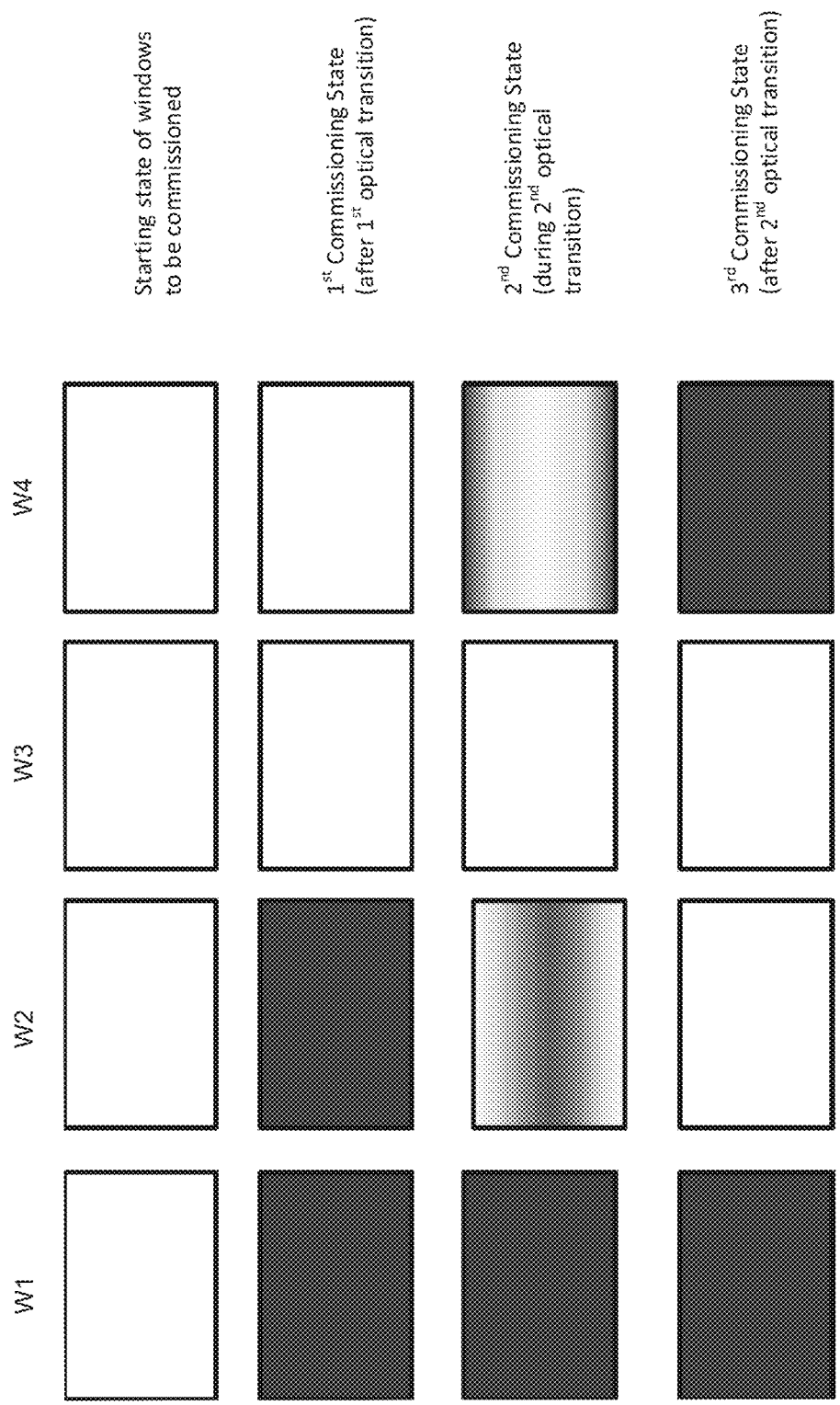
FIG. 7 illustrates a set of four electrochromic windows being commissioned, where the commissioning states include transitory tint states.

In some embodiments, one or more commissioning states may relate to a (transitory) combination of two or more tint states. When an optical transition is initiated on an EC device, the change in optical state originates near the edges of the device, close to the bus bars, then proceeds towards the center of the device. For example, when an electrochromic window is instructed to switch from clear to tinted, the edges of the device near the bus bars will become tinted first, and the center region of the device will become tinted last, as shown in FIG. 7, described further below. The optical state of the device can be monitored throughout the optical transition to provide information about both the starting and ending optical states of the transition. The path-dependent nature of the optical state of the device provides additional information compared to a static tint state, and this additional information can be used to further distinguish the windows from one another. Once the windows have completed the transition and reached steady state, the center-to-edge gradients disappear, and the additional information related to the path-dependent nature of the transition is lost. Thus, time-sensitive/transitory commissioning states can be used, which will speed up the commissioning process if the optical viewings can be done while the windows are in transition. In certain embodiments, while the window is in transition, the controller changes the voltage to reduce the current down to approximately zero amps which "freezes" the visual state of the window, substantially increasing the time that the user has to view the windows in the time-sensitive/transitory commissioning states.

In another embodiment, the number of distinguishable commissioning states may be effectively increased by performing a particular kind of transition after a tint state is reached. For example, the speed at which a window clears (or tints) may distinguish it from other windows that started at the same static tint state. Two windows that were both fully tinted may be distinguished if one is instructed to perform a fast clear and the other is instructed to perform a slow clear (or no clear). Essentially, the parameters used to define an optical transition can be used in addition to the static tint states to more effectively distinguish the windows from one another.

In certain embodiments, the user may be asked by the algorithm whether they would prefer to use time sensitive/transitory commissioning states. In certain embodiments the use of time-sensitive/transitory commissioning states is predefined. In certain embodiments the algorithm plans to use the time sensitive/transitory commissioning states, but if the user is not able to view the windows while they are in transition, and certain time passes, the algorithm determines that the transition is complete and options for selecting time sensitive/transitory commissioning states may be disabled, and subsequent window tinting/commissioning states are adjusted accordingly.

In an alternative embodiment, only one or a few window controllers are instructed in each pass through the commissioning process. Any number of different commissioning states can be used, as long as they are readily distinguishable from one another (e.g., by human eye, or by a detector or camera). In one example, three different tint states are used for the commissioning states: (1) clear, (2) moderately tinted, and (3) fully tinted. A non-limiting example of three tint states would be: (1) between about 50% and about 70% transmission, (2) between about 6% and about 30% transmission and (3) between about 0.5% and about 2% transmission. In another example, four different tint states (e.g., tint 1-4) are used as the commissioning states: (1) clear, (2) slightly tinted, (3) moderately tinted, and (4) fully tinted. A non-limiting example of four tint states would be: (1) between about 50% and about 70% transmission, (2) between about 20% and about 40% transmission, (3) between about 6% and about 15% transmission and (4) between about 0.5% and about 2% transmission. As used herein, the terms "tint0," "tint1," etc. can correspond to any desired tint states, as long as the electrochromic windows are capable of achieving such states and the states are distinguishable, either by the human eye or by a detector, e.g., a photometer, light sensor and the like. In cases where the windows transition between states other than clear and tinted (e.g., where the window transitions between being reflective and non-reflective, etc.) these states may be used in place of tint states.

During operation 604, the instructions should differ between individual window controllers to the extent possible based on the number of distinguishable commissioning states available. For example, where a network includes 3 electrochromic windows (and associated window controllers), each capable of transitioning to 3 distinguishable commissioning states (referred to as tint1, tint2, and tint3), operation 604 may involve instructing the first window controller to transition its associated window to tint1, instructing the second window controller to transition its associated window to tint2, and instructing the third window controller to transition its associated window to tint3. These instructions may be made simultaneously such that the windows tint (or clear) simultaneously. When relatively few unique commissioning states or other indicia are employed, a correspondingly low number of windows may be triggered in any given pass through the commissioning procedure (e.g., operations 604, 606, and 608), though this is not always the case. For example, for bi-state electrochromic windows having only two states, a clear and a tinted state, several iterations of 604 and 606 may be performed in order to identify individual windows using the iterative tint patterns (e.g., using deconvolution methods). If other window controllers must be located, these may be handled in subsequent iterations or they may be located at the same time as the initial window controllers, but using more sophisticated tinting/commissioning instructions as described below. Even if few commissioning states or other indicia are used, all of the windows may be simultaneously tinted, with additional iterations being used to eventually distinguish all the window controllers from one another, as described herein.

Next, at operation 606, the commissioning state of each window is recorded. This may be done manually or electronically. In some cases, a commissioning program (which may run on an electronic device such as a computer, tablet, smartphone, etc.) may be used. Details related to such a program are discussed further herein. In cases where the commissioning states are all static tint states, the recording may be done after the transitions are complete. In cases where one or more commissioning states relates to a transitory combination of starting optical state and ending optical state (e.g., as described in relation to FIG. 7, below), the recording may (also) be done while the transitions are ongoing (e.g., to glean the additional path-dependent information mentioned herein).

At operation 608, it is determined whether the windows are identifiable as being associated with a particular controller, for example, based on the instructions sent in operation 604 and the commissioning states recorded in operation 606. If the relationship between each window and its associated window controller is identifiable, the method continues with operation 610, described further below. If the relationships between the windows and their associated controllers is not yet identifiable (e.g., where there are multiple windows that have received the same series of commissioning states, and where such windows are not controlled by the same window controller), the method repeats starting with operation 604 where the window controllers are instructed to transition their associated windows to another identifiable commissioning state.

Whether or not the windows are identifiable with their associated window controllers depends on the number of windows being commissioned and the number of distinguishable commissioning states available. In the example above with 3 windows and 3 distinguishable tint states (used as the commissioning states), only one iteration of operations 604/606 may be used. In a similar example with 6 windows and 3 identifiable tint states (used as the commissioning states), two iterations of operations 604/606 may be used. The minimum number of iterations of operations 604/606 may be calculated as follows:

$$\text{Minimum Iterations} = \left(\frac{\ln(N_w)}{\ln(t_{levels})}\right) \text{rounded up to the next integer} \quad \text{Equation 1}$$

Where:
$N_w$=the number of windows being analyzed, and
$t_{levels}$=the number of distinguishable tint or commissioning states available In another example, a network includes 90 electrochromic windows capable of four distinguishable commissioning states. In this case, the minimum number of iterations for uniquely identifying the windows is (ln(90)/ln(4))=3.2, which rounds up to 4.

Similarly, the maximum number of windows that can be analyzed in a given number of steps using a given number of distinguishable commissioning states may be calculated as follows:

$$\text{Maximum Number of Windows Analyzed} = t_{levels}^{steps} \quad \text{Equation 2:}$$

Where:
$t_{levels}$=the number of distinguishable commissioning states available, and
steps=the number of commissioning state instruction/recordation iterations For example, where 3 distinguishable commissioning states are available and 4 iterations are performed, the maximum number of windows that can be simultaneously analyzed and commissioned is $3^4$=81. In some cases, it may be beneficial to ensure that each window receives at least one command to tint the window to some degree. In other words, it may be beneficial to ensure that no single window receives only tint state instructions that cause it to clear. In this way, the commissioning process may double as a testing procedure to ensure that all of the electrochromic windows are functioning. In such cases, the maximum number of windows analyzed may be one less than the number calculated above (to exclude the "nothing but clear tint states" pattern).

At operation 610, the window controllers are associated with the windows/locations based on the pattern of commissioning state instructions sent during operation 604 and the commissioning states observed/recorded in operation 606. For example, a particular controller that instructed its associated window to transition (in order) to tint4/tint1/tint 4 can be matched with the window/location where such a pattern of tint states/commissioning states was observed. This association is described in further detail in relation to FIG. 6B.

Figure 6B:
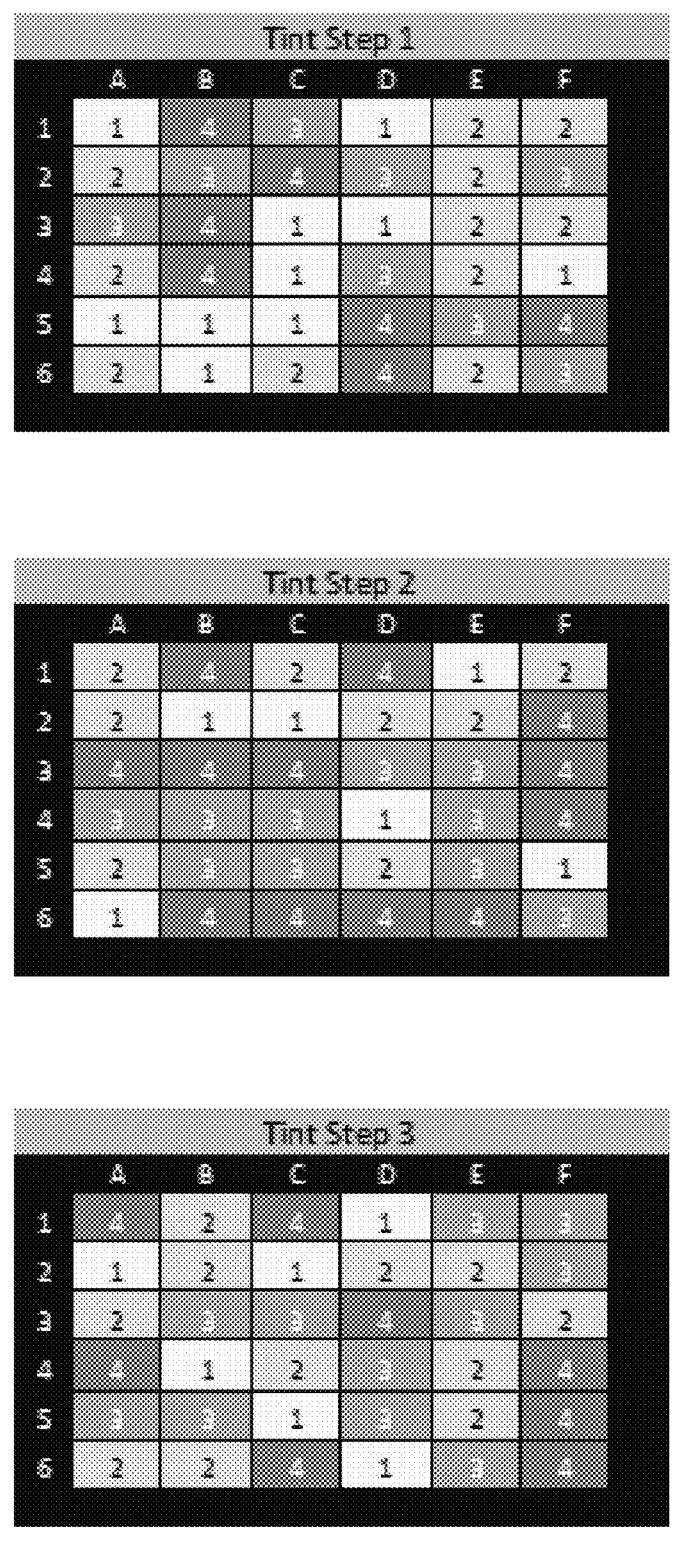

FIG. 6B illustrates three iterations of operations 604/606 from FIG. 6A in the context of a curtain wall having 6 rows (1-6) and 6 columns (A-F) of electrochromic windows, for 36 total windows. In this example, four distinguishable tint states are used, labeled 1-4. As such, the minimum number of iterations is (ln(36)/ln(4))=2.6, which rounds up to 3.

In the first iteration (labeled Tint Step 1), each of the window controllers instructs its associated window to transition to one of the 4 distinguishable tint states, as shown. As shown in FIG. 6B, window A1 transitions to tint state 1, for example, while window E2 transitions to tint state 2. The actual assignment of tint states to windows does not matter as long as the pattern of tint states (or other commissioning states) used over the course of the method allows for the relationships between the windows and their associated window controllers to be identified.

In the second iteration (labeled Tint Step 2), each of the window controllers instructs its associated window to transition to one of the 4 distinguishable tint states, where the set of instructions provided in the second iteration differs from the set of instructions provided in the first iteration. Some windows may receive the same tint command in the second iteration as the first iteration. However, at least some of the windows will receive an instruction to transition the window to a different tint state in the second iteration compared to the first iteration. For example, window A1 is instructed to transition to tint1 in the first iteration and tint2 in the second iteration, while window E2 is instructed to transition to tint2 in both the first and second iteration. After the second iteration, many of the windows can be distinguished from one another, but not all of the windows can be uniquely identified. For example, windows A1 and A5 are both at tint1 during the first iteration and tint2 during the second iteration. Thus, a third iteration may be used.

In the third iteration (labeled Tint Step 3), each of the window controllers instructs its associated window to transition to one of the 4 distinguishable tint states, where the set of instructions provided in the third iteration differs from the set of instructions provided in the first and second iterations. This third iteration, in combination with the first two, allows for all of the windows to be uniquely identified. For example, windows A1 and A5 can now be distinguished because window A1 is at tint4 and window A5 is at tint3. The sequence of tint states (or other optical states) experienced by an electrochromic window during this commissioning process may be referred to as the tint pattern for the electrochromic window.

In another example, each window or window controller being commissioned may be assigned a distinct number, and a series of commissioning states unique to the window or window controller may be defined for each window or window controller. The series of commissioning states may be defined based on the assigned number, or it may be randomly generated. This embodiment is discussed further in the context of FIGS. 6C-6E. Although the electrochromic windows are divided into four different groups in the example of FIGS. 6C-6E, such grouping is not necessary. In some embodiments, the method described in relation to FIGS. 6C-6E may be performed on an entire group of windows, without any need to divide the windows into sub-groups. The group may include all of the electrochromic windows being commissioned. In such embodiments, the method is essentially the same as described in relation to FIGS. 6C-6E, except no sub-groups are defined, and the number assigned to each window or window controller is unique (i.e., the numbers do not repeat between different sub-groups, as there are no sub-groups).

The examples described in relation to FIGS. 6A and 6B assume that each window controller controls a single associated electrochromic window. However, this is not always the case. In some installations, a single window controller may control more than one electrochromic window. For example, two, three, four, or more electrochromic windows may be controlled by a single window controller. The windows controlled by a single window controller may exhibit the same tinting behavior, since the window controller may provide a single set of instructions that is applied to each of the associated electrochromic windows, although this is not always the case. When this is the case, it may not be possible to uniquely identify each of the electrochromic windows based solely on the displayed tint patterns (e.g., because the windows associated with a particular controller may always display the same tint state/behavior). However, the relationship between each window controller and each of its associated electrochromic windows can still be identified.

In one example, a set of 16 electrochromic windows is controlled by 4 window controllers that each control 4 associated electrochromic windows. By following the methods described herein (e.g., the method of FIG. 6A, or another method described herein), it can be determined which windows are associated with each window controller. For example, if two distinguishable optical states are available, it would take two iterations of the method of FIG. 6A to determine which window controller each electrochromic window is associated with. Instead of repeating the method until each individual window is uniquely identifiable, the method is repeated until the relationship between each window and an associated window controller is identifiable.

Where individual window controllers are associated with multiple electrochromic windows, the methods are essentially the same as those described above, except that at the end of the method, the windows controlled by the same window controller may not be distinguishable from one another. Since all of these windows are controlled by the same window controller, it is not necessary to make any further distinction between the electrochromic windows.

In certain implementations where a single window controller controls multiple associated electrochromic windows, the program/application used to facilitate the commissioning process may be configured to allow several electrochromic windows to be associated with a single window controller. By contrast, in cases where only a single electrochromic window is associated with each window controller, this same condition may be treated as a user entry error (e.g., the program may determine that a user has made an error when entering the optical states of the windows if two windows show the same series of tint states). In some embodiments, if it is determined that two or more electrochromic windows have displayed the same series of tint states, the program/application may prompt the user to confirm that the relevant windows are controlled by the same window controller. Similarly, the program/application may provide the user with the opportunity to correct their tint state entries, and/or provide the user with the opportunity to observe an additional transition for the relevant windows to determine whether or not the windows are indeed associated with a single window controller.

Returning to the embodiment of FIG. 7, some additional context will be provided. FIG. 7 illustrates four windows (W1-W4) which are each capable of achieving two distinct tint states (clear and tinted), but more than two distinct commissioning states. During commissioning, each window experiences three commissioning states after an initial starting state. At the initial starting state (row 1 in FIG. 7), each of the windows is in a clear state. At the first commissioning state (row 2), windows W1 and W2 are tinted and windows W3 and W4 are clear. The second commissioning state (row 3) is measured and recorded during a time when windows W2 and W4 are actively transitioning. At this time, window W1 remains tinted, window W2 is transitioning from tinted to clear (which is apparent because the edges are lighter than the center of the device), window W3 remains clear, and window W4 is transitioning from clear to tinted (apparent because the edges are darker than the center of the device). Further, at this time, all four windows W1-W4 can be uniquely identified based on the instant commissioning states, even though the windows used only two static tint states, which typically would have allowed unique identification of only two windows (unless or until additional tinting instructions are provided). The use of dynamic/transitory tint states as commissioning states can significantly increase the number of windows that can be simultaneously commissioned with a given number of tinting instructions.

If the user views the windows while the windows are in the second commissioning state (row 3 of FIG. 7), viewing the windows in the first or third commissioning states is not required. This is because, as noted above, the windows are uniquely identifiable when in the second commissioning state, which allows for the association between each window and its associated window controller to be identified. However, in case the user is unable to complete observations of all the windows while the windows are in the second commissioning state (e.g., due to the transitory nature of certain commissioning states), he/she can still view the third commissioning state and gain information about the window identification. In some embodiments, the commissioning method may involve dynamically adjusting the next commissioning state for each window (or a subset of the windows) based on the results obtained/recorded during an initial part of the commissioning method. For example, if a transitory commissioning state was planned for/executed, but the user was not able to view or record the transitory commissioning state for one or more of the windows, the information related to the unrecorded transitory commissioning state is lost. In response, the next set of instructions for tinting the windows may be modified to enable the optimal identification of all windows based on the all the information available at that point in time.

The third commissioning state (row 4) is recorded after the optical transition is complete. At this time, window W1 is still tinted, window W2 is clear, window W3 is still clear, and window W4 is tinted. Each window has experienced a unique combination of commissioning states, and as such, the relationships between each window and its associated window controller can be identified. However, as mentioned above, it may not be necessary to wait until this third commissioning state is achieved, at least because the relationship between each window and its associated window controller can be determined solely based on the second commissioning state for this example.

In certain embodiments, the size and aspect ratio of the windows can be used to identify the windows and divide them into sub-groups. Dividing the windows into sub-groups may be useful since it potentially can reduce the number of iterations required to identify the relationship between each window and its associated window controller. With reference to Equation 1 above, $N_w$ may refer to the number of windows in the largest sub-group rather than the number of windows in the full facade. The number of sub-groups (and relatedly, the number of windows in each sub-group) can be decided before the IGU identification process starts. A non-limiting example could be to define the sub-groups as windows with Area <10 ft$^2$ (small windows), 10 ft$^2$<Area <30 ft$^2$ (Med windows), and Area >30 ft$^2$ (large windows). Another non-limiting example could be to define the sub-groups based on the aspect ratio of the individual windows, with aspect ratio <1.1 ("square" windows), and aspect ratio >1.2 ("rectangular" windows). Another example could be to define the sub-groups based on size and aspect ratio, e.g., small square, small rectangle, medium square, medium rectangle, etc. The binning thresholds for size, aspect ratio (or other features) can be determined based on the window sizes present in the specific facade being commissioned. For instance, for a facade with a mix of 10-12 ft$^2$ and 28-30 ft$^2$ windows the threshold between small and medium size windows could be set at 15 ft$^2$. The sub-grouping rules should be chosen to minimize the number of windows in the largest sub-group (i.e., $N_w$), not necessarily try to divide the windows into the most uniform sub-groups. For example, if there are 60 windows in a facade and 3 commissioning states are possible, it is beneficial to divide the facade into a grouping of say {27, 27, 6} instead of say {30, 15,15}, as the first grouping scheme will now require one less tint iteration to identify the windows.

As mentioned, the windows may be split into groups or zones of windows, with a different tint pattern (or other series of commissioning states) sent to each window in the group. In some cases, the window controllers/windows may be initially mapped to their desired locations, though such mapping may be unconfirmed in practice. In other words, an installer may have a map of where each window controller/window should be, but this map may not correspond to where the window controllers/windows were actually installed. The mapping is not required. The windows may be provided in a curtain window/facade in some cases. The grouping may be determined based on a perceived potential for mis-wiring in some cases. For example, if it is assumed that the windows are no more than 1 position away (e.g., in a row or column) in any direction from their mapped locations, the windows may be divided into subsets of 3×3 windows (9 windows in each group). If it is assumed that the windows are no more than 2 positions away from their mapped locations, the windows may be divided into subsets of 5×5 windows (25 windows in each group). If it is assumed that the windows may be more than 2 positions away, larger groups of windows may be used.

In certain embodiments, within each group of windows/window controllers, the windows or window controllers may be assigned a distinct number (e.g., window 0, window 1 . . . window N−1, where N is the number of windows in the group). As mentioned above, this embodiment may also be practiced on a single large group of windows that is not split into smaller sub-groups. FIG. 6C presents one example of a 6×6 facade of windows (36 total windows) that is divided into four groups of 3×3 windows (9 windows in each group). FIG. 6D illustrates the numbers that are assigned within each group. The patterns (e.g., number assignments) within each group are chosen to prevent aliasing across different rows/columns between groups. Because each group includes 9 windows, the windows (or window controllers) in each group are assigned a number between 0-8, as shown in FIG. 6D. The number assigned to each window (or window controller) corresponds to a particular tint pattern (or other series of commissioning states). The tint pattern (or other series of commissioning states) for a particular number may be randomly generated, or it may be generated based on a particular method. In one example, the number assigned to an individual window (or window controller) is mapped to a tint pattern based solely on the window number (or window controller number). For instance, assuming that three distinguishable tint states (or other commissioning states) are available, the number may be converted into base three. The resulting converted number may be directly mapped to the available tint states (or other commissioning states). In some cases, each digit in the converted number may represent a tint state (or other commissioning state) that the window is instructed to achieve, with the tint states (or other commissioning states) being achieved in the order of the digits. The tint pattern (or other series of commissioning states) for a particular window is therefore defined by the converted number. In cases where the converted number has fewer digits than other converted numbers, additional zeros may be provided before the first digit (see windows A1-C1 in FIG. 6E, for example).

FIG. 6E presents the window facade of FIGS. 6C and 6D, with the window number from FIG. 6D converted into base 3. Each digit in the converted number corresponds to a tint state, with 0 being tint0, 1 being tint1, and 2 being tint2. Transitory commissioning states (e.g., as described in relation to FIG. 7) are not used in this example, though they could be. In this embodiment, window A1 is designated "00" and therefore the tint pattern displayed on this window will be tint0, followed by tint0 (there may or may not be a clear between these). Window A2 is designated "10" and therefore the tint pattern displayed on this window will be tint1, followed by tint0. The tint1 state corresponds to the first digit (1), and the tint0 state corresponds to the second digit (0). Similarly, window C3 is designated "22" and the tint pattern displayed on this window will be tint2, followed by tint2. As noted, the patterns may also be randomly generated, so long as it can be determined which window controller is sending which pattern of tint states. Each set of tint states (or other commissioning states) among the windows may be recorded for the purpose of matching up the window pattern instructions with the observed tint states/commissioning states. In some cases, a program may be used to verify whether each window controller lines up with its expected position. The program may compare the instructions sent by each window to the observed series of commissioning states to identify any mismatched window controllers. In some cases, the windows may have no expected position, and the method may be repeated as many times as needed to distinguish the various windows. If there is any doubt about the location of a window controller or set of window controllers after the tint patterns are recorded (e.g., if it is necessary to distinguish between similarly numbered windows/window controllers, for example, the window controllers associated with windows A1 and F3, which will display the same tint pattern as shown in FIG. 6E), the method can be repeated using the subset of windows to be distinguished.

One with skill in the art will appreciate that the commissioning methods described above may begin commissioning electrochromic windows in any tint or commissioning state, from fully tinted or colored to completely clear or bleached, if so desired. If electrochromic windows arrive at a destination from a manufacturer in a clear tint state, for example, then electrochromic windows wishing to begin in a particular non-clear tint or commissioning state must first be driven to that state. If it is desired that IGUs arrive at a destination in a clear or bleached tint state, pigtail caps, such as those developed by View, Inc. of Milpitas, Calif., may be used. Pigtail caps protect IGU pigtail wiring and drain current from IGUs during transit from a manufacturer to an installation site, ensuring that IGUs arrive at a destination in a clear or bleached tint state.

VIII. Triggers and Responses: Non-tinting Actions

Triggers that do not cause electrochromic windows to transition their optical tint states may be considered a second type of triggers. Examples of non-tinting triggers that may be used to acquire an ID (e.g., a network address) or a position include shining a light or laser on a sensor, activating a motion or occupancy sensor, activating a temperature/heat sensor, activating an acoustic sensor, activating a sensor via magnetism, and pressing a button or switch. Examples of non-tinting responses that may be used to determine the location of a device include emission of optical signals (e.g., light or LED patterns), emission of electromagnetic signals (e.g., UWB signals that may be used for geolocation), and emission of audible signals.

In some implementations, IGUs include a light sensor that can be triggered via a laser pointer or other shining light. An installer can shine the laser pointer on the sensor of the IGU to cause the IGU to respond by sending a signal to the network with the IGU's and/or its associated controller's identification. Because the installer knows where the laser pointer is being pointed, this allows for a relatively easy way to associate each IGU with its physical location. This laser pointer method is highly reliable, and can be used to identify large numbers of windows, even when provided in a curtain wall with many adjacent IGUs. In another example, the IGUs include a light sensor, motion sensor, occupancy sensor, etc. that can be triggered by blocking or disrupting the sensor, e.g., waving at the sensor, covering the sensor, etc. In another example, the IGUs include a magnetic field sensor that can be triggered by placing a magnet near the sensor. In yet another example, the IGUs include an acoustic sensor that can be triggered by producing an acoustic signature such as an audible command from a technician. In yet another example, the IGUs include a button or switch that can be manually activated to cause the IGU to send a signal to the network. In another example, the IGUs include a temperature and/or heat sensor that can be triggered by aiming a focused heat source, e.g., a heat gun, at the sensor. The temperature/heat sensor can, for example, be located within or on the IGU, e.g., as part of an onboard controller. Regardless of the type of trigger used, this feature may enable an easy configuration process for commissioning several electrochromic windows on a network.

Sensor(s) used for triggering the IGUs may be positioned anywhere on the IGUs, e.g., on a pane (e.g., on S1, S2, S3, S4, S5, S6, etc.), on a frame or other component in which the IGU is installed, proximate the IGU on a wall, etc. In various cases, the sensor(s) used for triggering the IGUs may be positioned on the inbound surface of the most inbound pane (e.g., S4 on a two pane IGU, or S6 on a three pane IGU, or S2 of an electrochromic window having only a single pane). In cases where the sensor is a temperature sensor, the sensor may be unidirectional (sensing heat from one direction) and, e.g., only sensing a temperature/heat signal from within the building. In other cases the sensor may be omnidirectional (or may have both unidirectional and omnidirectional modes). The temperature sensor may be an infrared sensor, as used in a remote control device, such as a television remote. The positioning of the temperature sensor (or other sensor) can be within or on an onboard controller, or not. While various commissioning methods described herein are described in the context of an IGU, it is understood that other types of windows can utilize these same methods. For example, a temperature sensor (or any other sensor that may be triggered) may be located on an electrochromic window having a laminate structure, the sensor optionally being part of a controller, e.g., an on-glass controller, or not.

In some implementations, each IGU may be triggered over the network, e.g., by an installation technician issuing a command through an electronic device and/or application to an electrochromic window and its respective controller, which may cause a component on the IGU to respond by notifying an installer/user that it has been triggered. In one example, each IGU may include a light (e.g., an LED or other light) that can be activated. A signal can be sent over the network to trigger a relevant IGU or window controller, which then causes the light on the relevant IGU to be turned on in response (or off, or blink, or blink in a certain pattern, etc.). An installer/user can then identify the relevant IGU by seeing which IGU has the triggered light or light pattern. Based on this process and information, the installer/user can associate each IGU/controller with its physical location and identification.

In one example, each controller is instructed to display a unique light pattern such that all of the windows on the network (or in some cases, a subset thereof) can be simultaneously triggered and observed. The light patterns can be distinguished from one another based on the frequency of light pulses, the duration of light pulses, the time between light pulses, the brightness of light pulses, etc. The light patterns may have certain characteristics that make them easier to detect. For instance, each "on" and/or "off" of the pattern may be a minimum duration that allows for the "on" or "off" to be detected by a camera or other detection device.

In some cases, this minimum duration may be about 50 ms, which may be sufficient for a 60 Hz camera to pick up 3 frames.

In one example, the light patterns are configured to display information in binary (e.g., light off=0, light on=1). This technique may be used to encode any information about the window/window controller, including the relevant IDs for these components.

In some cases, the light patterns may repeat until instructed to stop, allowing sufficient time for an installer to observe and record the light patterns. Such recordation may occur manually, though in various cases it may be done using an electronic application that may be configured to detect and record the light patterns. The light patterns may each begin with a uniform "starting sequence" and/or end with a uniform "ending sequence" that may be used to determine the starting and/or ending points of a light pattern. The light patterns may have the same duration between different windows, such that all the light patterns repeat at the same frequency. In other cases, the light patterns may have different durations, and may repeat at the same or different frequencies.

The light may be provided anywhere on the window, so long as it is detectable in some fashion and is capable of receiving power. In one example, an LED is provided between the panes of an IGU, and may be flush with a spacer. The light may also be provided on one of the panes, outside of the interior region of the IGU. The light may be provided within the viewable area of the IGU. In various cases, the light may be flush with the spacer, as mentioned, to minimize the visual distraction associated with the light. The light may emit visible light or non-visible (e.g., IR-wavelength) light. In cases where the light is non-visible to human eyes, a detector may be used to observe and record the light patterns.

The LED may be electrically connected with a window controller using any of the electrical connections described herein. The LED may also be self-powered, for example with a battery or any of the other self-powering options described herein. In some cases, the LED may be electrically connected to or with a pigtail attached to the IGU, where the pigtail is used to provide power to the IGU.

Once the light patterns are recorded, it can be determined which window controller is connected to which electrochromic window, and where each electrochromic window is located. This determination may be made by comparing the instructions sent by each window controller to the observed light patterns on the various electrochromic windows. In various cases, the comparison and association is performed by a program or application (which may be operated by an installer). Moreover, if any of the LEDs fail to display a light pattern, the associated windows can be flagged as potentially being mis-wired or otherwise faulty. One advantage of the LED commissioning method is that LEDs are relatively inexpensive. Another advantage is that the identifications can be made very quickly, as there is no need to wait for the electrochromic windows to perform any optical transitions.

In some implementations, IGUs that are triggered over the network may respond audibly. For example, a window controller may be equipped with speaker that produces an audible signature which may be used to determine its location. In some cases, an audible signature is the range of about 20 Hz to about 20 kHz and may be heard by a technician who may determine the location of a device. In some cases, an audible signature may have a frequency greater than about 20 kHz and may be recorded a detector such as a high-frequency microphone. In some cases, a triggered IGU may respond by emitting an RF, UWB, Bluetooth, or another wireless electromagnetic signal. The location of the emitted signal may be determined based the strength of the emitted signal and/or triangulation and geo-positioning methods described in more detail elsewhere herein.

IX. Detecting Responses

As described, installation technicians, related professionals or users, and cameras or other detection devices can detect the trigger responses of electrochromic windows or other electrochromic window network devices for commissioning purposes.

Installers or detection devices (e.g., cameras, microphones, etc.) can view the triggered response of an electrochromic window network device and associate the physical location of the triggered device with its network address or ID, e.g., on an application on an electric device. Cameras or other detection devices may similarly send electrochromic window network device response detection data to the network or an installation technician for processing, e.g., associating the physical location of the triggered device with its network address or ID.

Furthermore, detecting responses may also be done by the network. For example, when devices are triggered, responses may be sent as information to the network for processing for commissioning or other purposes, as is the case when a light or laser pointer is shined on a sensor of an IGU.

Antennas may also play a role in detecting trigger responses. Antennas may be incorporated into IGUs, e.g., patterned onto a lite of an electrochromic window or an associated IGU component, or be located in the vicinity of IGUs to receive and locate communications from window controllers and their electrochromic windows triggered for commissioning, e.g., during auto-commissioning, described below.

X. Automated Commissioning: Mesh Networks

In some implementations, an electrochromic window network may have its commissioning process or part of the commissioning process automated or provided for during mandatory installation steps.

In some implementations, the electrochromic window controllers are provided in a network such as a self-meshing, self-healing communications network, in which the window controllers recognize one another based on sensed and/or programmed inputs when the electrochromic windows are first installed and turned on. One or more of the controllers, e.g., a master controller, may develop a map of the windows based on the self-meshing network and the information provided by the sensed and programmed inputs. In other words, the system may "self-virtualize" by creating a model of where each window is in relation to the other windows, and optionally in relation to a global position (e.g., a GPS location). In this way, installation and control of the windows is simplified, because the windows themselves do much of the work in figuring out where they are positioned and how they are oriented. There is little or no need to individually program the location and orientation of each window. In this way, the network discovers the physical location of devices on the network, either with respect to other devices or in absolute physical location, e.g., a GPS location, and pairs them with their network addresses.

XI. Automated Commissioning: Ultra-Wideband Protocol

In some embodiments, window location determination is automated after installation. Window controllers, and in some instances windows configured with antennas and/or onboard controllers, may be configured with a transmitter to communicate via various forms of wireless electromagnetic transmission; e.g., time-varying electromagnetic fields. Common wireless protocols used for electromagnetic communication include, but are not limited to, Bluetooth, BLE, Wi-Fi, RF, and ultra-wideband (UWB). The relative location between two or more devices may be determined from information relating to received transmissions at one or more antennas such as the received strength or power, time of arrival or phase, frequency, and angle of arrival of wirelessly transmitted signals. When determining a device's location from these metrics, a triangulation algorithm may be implemented that in some instances accounts for the physical layout of a building, e.g., walls and furniture. Ultimately, an accurate location of individual window network components can be obtained using such technologies. For example, the location of a window controller having a UWB micro-location chip can be easily determined to within 10 centimeters of its actual location. In some instances, the location of one or more windows may be determined using geo-positioning methods such as those described in U.S. Patent Application No. 62/340,936, filed on May 24, 2016 titled "WINDOW ANTENNAS," which is hereby incorporated by reference in its entirety. As used herein, geo-positioning and geolocation may refer to any method in which the position or relative position of a window or device is determined in part by analysis of electromagnetic signals.

Pulse-based ultra-wideband (UWB) technology (ECMA-368 and ECMA-369) is a wireless technology for transmitting large amounts of data at low power (typically less than 0.5 mW) over short distances (up to 230 feet). A characteristic of a UWB signal is that it occupies at least 500 MHz of bandwidth spectrum or at least 20% of its center frequency. According to the UWB protocol, a component broadcasts digital signal pulses that are timed very precisely on a carrier signal across a number of frequency channels at the same time. Information may be transmitted by modulating the timing or positioning of pulses. Alternatively, information may be transmitted by encoding the polarity of the pulse, its amplitude and/or by using orthogonal pulses. Aside from being a low power information transfer protocol, UWB technology may provide several advantages for indoor location applications over other wireless protocols. The broad range of the UWB spectrum comprises low frequencies having long wavelengths, which allows UWB signals to penetrate a variety of materials, including walls. The wide range of frequencies, including these low penetrating frequencies, decreases the chance of multipath propagation errors as some wavelengths will typically have a line-of-sight trajectory. Another advantage of pulse-based UWB communication is that pulses are typically very short (less than 60 cm for a 500 MHz-wide pulse, less than 23 cm for a 1.3 GHz-bandwidth pulse) reducing the chances that reflecting pulses will overlap with the original pulse.

The relative locations of window controllers having micro-location chips can be determined using the UWB protocol. For example, using micro-location chips, the relative position of each device may be determined to within an accuracy of 10 cm. In various embodiments, window controllers, and in some cases antennas disposed on or proximate windows or window controllers are configured to communicate via a micro-location chip. In some embodiments, a window controller may be equipped with a tag having a micro-location chip configured to broadcast omnidirectional signals. Receiving micro-location chips, also known as anchors, may be located at a variety of locations such as a wireless router, a network controller, or a window controller having a known location. By analyzing the time taken for a broadcast signal to reach the anchors within the transmittable distance of the tag, the location of the tag may be determined. In some cases, an installer may place temporary anchors within a building for the purpose of commissioning which are then removed after the commissioning process is complete. In some embodiments in which there are a plurality of optically switchable windows, window controllers may be equipped with micro-location chips that are configured to both send and receive UWB signals. By analysis of the received UWB signals at each window controller, the relative distance between each other window controller located within the transmission range limits may be determined. By aggregating this information, the relative locations between all the window controllers may be determined. When the location of at least one window controller is known, or if an anchor is also used, the actual location of each window controller or other network device having a micro-location chip may be determined. Such antennas may be employed in an auto-commissioning procedure as described below. However, it should be understood that the disclosure is not limited to UWB technology; any technology for automatically reporting high-resolution location information may be used. Frequently, such technology will employ and one or more antennas associated with the components, e.g., electrochromic windows, to be automatically located.

Interconnect drawings or other sources of architectural information often include location information for various window network components. Applications engineers and other professionals design interconnect drawings, which are depicted visually as modified architectural drawings, by designing the wiring infrastructure and power delivery system for the electrochromic window network layout within an architectural drawing or building plan framework. Architectural drawings show where electrical closets and other structural and architectural features are located within a building. When architectural drawings are not available, drawings may instead be created by surveying a site. Electrochromic windows may have their physical location coordinates listed in x, y, and z dimensions, sometimes with very high accuracy, e.g., to within 1 centimeter, in interconnect drawings. Similarly, files or documents derived from such drawings, such as network configuration files, may contain accurate physical locations of pertinent window network components in a textual representation of the interconnect drawings that are readable by electrochromic window network control logic.

In certain embodiments, coordinates will correspond to one corner of a lite or IGU as installed in a structure. The choice of a particular corner or other feature for specifying in the interconnect drawing coordinates may be influenced by the placement of an antenna or other location aware component. For example, a window and/or paired window controller may have a micro-location chip placed near a first corner of an associated IGU (e.g., the lower left corner); in which case the interconnect drawing coordinates for the lite may be specified for the first corner. Similarly, in the case where an IGU has a window antenna, listed coordinates on an interconnect drawing may represent the location of the antenna on the surface of an IGU lite or a corner proximate the antenna. In some cases, coordinates may be obtained from architectural drawings and knowledge of the antenna placement on larger window components such as an IGU. In some embodiments, a window's orientation is also included interconnect drawing.

While this specification often refers to interconnect drawings as a source of accurate physical location information for windows, the disclosure is not limited to interconnect drawings. Any similarly accurate representation of component locations in a building or other structure having optically switchable windows may be used. This includes files derived from interconnect drawings (e.g., network configuration files) as well as files or drawings produced independently of interconnect drawings, e.g., via manual or automated measurements made during construction of a building. In some cases where coordinates cannot be determined from architectural drawings, e.g., the vertical position of a window controller on a wall, unknown coordinates can be determined by personnel responsible for installation and/or commissioning. Because architectural and interconnect drawings are widely used in building design and construction, they are used here for convenience, but again the disclosure is not limited to interconnect drawings as a source of physical location information.

In certain embodiments using interconnect drawings or similarly detailed representation of component locations and geo-positioning, commissioning logic pairs component locations, as specified by interconnect drawings, with the network IDs (or other information not available in interconnect drawings) of components such as window controllers for optically switchable windows. In some embodiments, this is done by comparing the measured relative distances between device locations provided by geo-positioning and the listed coordinates provided on an interconnect drawing. Since the location of network components may be determined with a high accuracy, e.g., better than about 10 cm, automatic commissioning may be performed easily in a manner that avoids the complications that may be introduced by manually commissioning windows.

The controller network IDs or other information paired with the physical location of a window (or other component) can come from various sources. In certain embodiments, a window controller's network ID, (e.g., a CAN ID) is stored on a memory device attached to each window (e.g., a dock for the window controller or a pigtail), or may be downloaded from the cloud based upon a window serial number or LITE ID. In addition to the controller's network ID, other stored window information may include the controller's ID (not its network ID), the window's LITE ID, window type, window dimensions, manufacturing date, bus bar length, zone membership, current firmware, and various other window details. Regardless of which information is stored, it may be accessed during the commissioning process. Once accessed, any or all portions of such information are linked to the physical location information obtained from the interconnect drawing, partially completed network configuration file, or other source.

Figure 8:
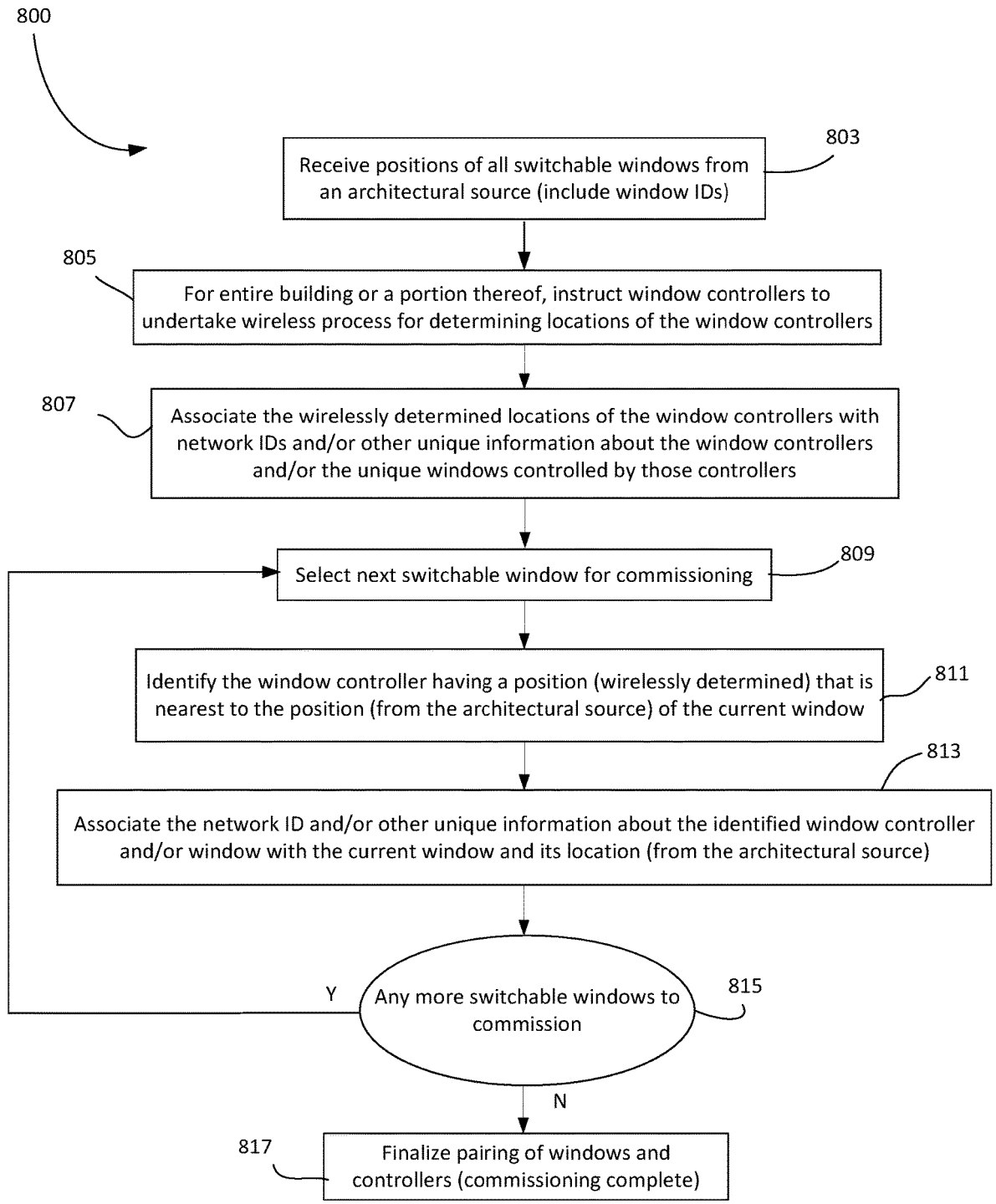
FIG. 8 is a flow chart depicting operations associated with an embodiment of auto-commissioning.

FIG. 8 presents an example process flow for commissioning installed optically switchable windows. As depicted, a commissioning process 800 begins with a process operation 803 in which the commissioning system receives positions of each of the optically switchable windows from an architectural source such as an interconnect drawing or a configuration file derived therefrom. These windows may include all switchable windows present in a particular building or a portion of the building such as one floor of the building or a façade of the building. In certain embodiments, in addition to receiving the positions of the windows, the commissioning system also receives network IDs, which may be included in the architectural source or in another source. As explained above, the location information obtained from an architectural source or similar source contains highly accurate three-dimensional positions of the windows. In certain embodiments, the locations received in operation 803 are accurate to within about 10 centimeters, or about 5 centimeters, or about 1 centimeter.

While operation 803 provides the highly accurate window positional information needed for commissioning, operations 805 and 807 provide information needed for uniquely identifying the window controller and/or the window(s) it controls. As depicted at process operation 805, the commissioning system instructs the window controllers for the entire building or portion thereof to undertake a wireless process for determining the locations of the window controllers. As explained, such operation may employ UWB protocol communications or other wireless process that provides reasonably high accuracy location information about the window controllers or other window network component that is used for commissioning. As explained, UWB processing can often provide location information to within about 10 centimeters of the network component containing a micro-location chip configured to implement the UWB protocol. In principle, any suitably accurate wireless or even non-wireless protocol can be employed to provide the needed locational information for associating network controllers or other components with the high accuracy positional information obtained for the optically switchable windows. In certain embodiments, any such procedure for locating window controllers will provide locational information for the network controller to an accuracy of at least about 20 centimeters or at least about 15 centimeters or at least about 10 centimeters.

In process operation 807, the location information for the window controllers obtained in process operation 805 is associated with the unique information about the window controllers. Such information uniquely describes the window controller and, in some embodiments, a window or windows associated with such controller. Examples of such unique information include network IDs for the window controllers, physical (non-network) IDs for the window controllers, configuration parameters for the window controllers, the serial numbers or LITE IDs of any windows to be controlled by the window controller, and various other parameters describing the windows to be controlled by the window controllers. The commissioning system produces a file or other collection of information that contains a rough positional location of the window controller—obtained through the wireless measurement procedure of operation 805—and unique identifying information about the window controller. With this information, the commissioning system has all it needs to undertake the actual commissioning process so that the electrochromic window network may fully operate.

In the depicted embodiment, the commissioning process loops over each of the windows in an installation or portion of the installation and commissions each one in succession. Of course, in some embodiments, the analysis or commissioning of the various windows may be conducted in parallel. In the embodiment depicted in FIG. 8, the individual windows are considered successively with current windows for commissioning being selected at a process operation 809. With the current window selected for commissioning, the commissioning system identifies the window controller having a position—as determined wirelessly in operation 805—that is nearest to the position of the current window, as determined from the architectural source at process operation 803. See process operation 811. Given the relative size of most windows and the accuracy of the wirelessly measured position of the window controllers, there is often little ambiguity in associating particular windows with their associated window controllers. Various techniques for determining distances between locations of windows and window controllers may be used. Some are described below. The techniques may consider windows in isolation or collectively.

After the commissioning system determines the closest window controller in operation 811, the system associates the network ID and/or other unique information about the identified window controller (and/or its window(s)) with the current window and its location, as determined from the architectural source. See process operation 813.

At this point, the current window has been effectively commissioned, so the commissioning system determines whether there are any more switchable windows to be commissioned. See decision operation 815. If more such windows exist, process control returns to process operation 809, where the commissioning system selects the next switchable window for commissioning. If, on the other hand, there are no more windows to be commissioned, process control is directed to a process operation 817 which finalizes the pairing of the windows and controllers and otherwise completes the commissioning process.

Figure 9:
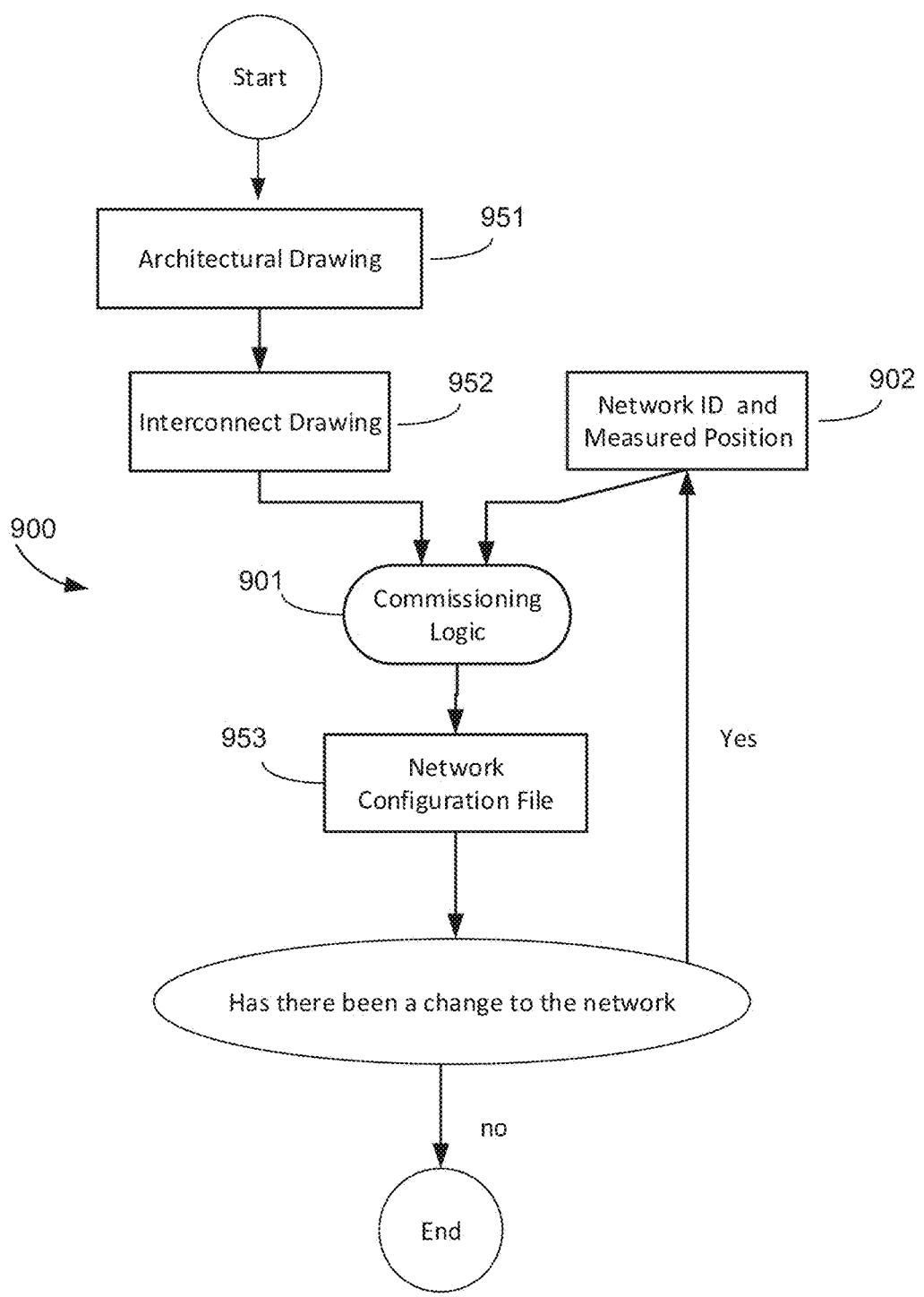
FIG. 9 shows the process in which commissioning logic may be used to generate a network configuration file.

FIG. 9 depicts a process 900 involving commissioning logic 901 (part of a commissioning system) and a network configuration file 953. Process 900 begins by gathering building information from architectural drawings 951. Using the building information provided by architectural drawings, a designer or design team creates interconnect drawings 952 which include plans for a window network at a particular site. Once network components such as IGUs and window controllers are installed, the relative positions between devices can be measured by analysis of electromagnetic transmissions as has been described elsewhere herein. The measured positions and network ID information 902 is then passed to commissioning logic 901 which pairs the network ID (or other unique information) of a device with its place within a hierarchal network as depicted in the interconnect drawings 952. The location of an associated window or other device, as taken or derived from the interconnect drawing, is also paired with the network ID or other unique information. The paired information is then stored in a network configuration file 953. As long as no changes are made to the network or window installations, no changes are needed to the network configuration file. If, however, a change is made, for example, an IGU is replaced with one having a different window controller, then commissioning logic 901 is used once to determine the change and update the network configuration file 953 accordingly.

As a teaching example, consider an interconnect drawing having window controllers located at three positions (each associated with the lower left corner of an associated window) along the wall of the building: a first position intended to have a first window controller at (0 ft, 0 ft, 0 ft), a second position intended to have a second window controller at (5 ft, 0 ft, 0 ft), and a third position intended to have a third window controller at (5 ft, 4 ft, 0 ft). When measuring coordinates of the three controllers, one of the controllers is set as a reference location (e.g., the controller personnel responsible for commissioning sets the controller in the first position as a reference point). From this reference point, the coordinates of the other two windows are measured resulting in a window coordinates of (5.1 ft, 0.2 ft, 0.1 ft) and (5.0 ft, 3.9 ft, −0.1 ft). Commissioning logic then easily perceives the window having coordinates (5.1 ft, 0.2 ft, 0.1 ft) to be in the second position and a window having coordinates (5.0 ft, 3.9 ft, −0.1 ft) to be in the third position. Information describing the physical and hierarchical position of each component from interconnect drawings is then paired with the network ID information (or other unique information) which may be transmitted to the commissioning logic over the network when the position of network components is determined.

Commissioning logic may incorporate a range of statistical methods to match physical device coordinates with coordinates listed on an interconnect drawing. In one embodiment, matching is performed by iterating through the various permutations of assigning a device to each of the possible interconnect locations and then observing how closely the location of other components, as determined using relative distance measurements, corresponding to the locations of other network component locations as specified on the interconnect drawing. In some instances, network components are matched with coordinates listed on an interconnect drawing by selecting the permutation that minimizes the mean squared error of the distance of each component to the closest component location specified by the interconnect drawing.

This auto-commissioning method may also useful if, for example, a new component is added to the network, an old component is removed from a network, or when an old component is removed and replaced on the network. In the case of a new component, the component may be recognized by the window network and its location may be determined by one of the previously described methods. Commissioning logic may then update the network configuration file to reflect the addition. Similarly, commissioning logic may update a network configuration file when a component is removed and no longer recognized by the window network. In cases where a component is replaced, commissioning logic may notice the absence of a component on the network and the presence of a new component reporting from the same coordinates of the missing component. Commissioning logic may conclude that a component has been replaced, and thus updates the network configuration file with the network ID of the new component.

Figure 10:
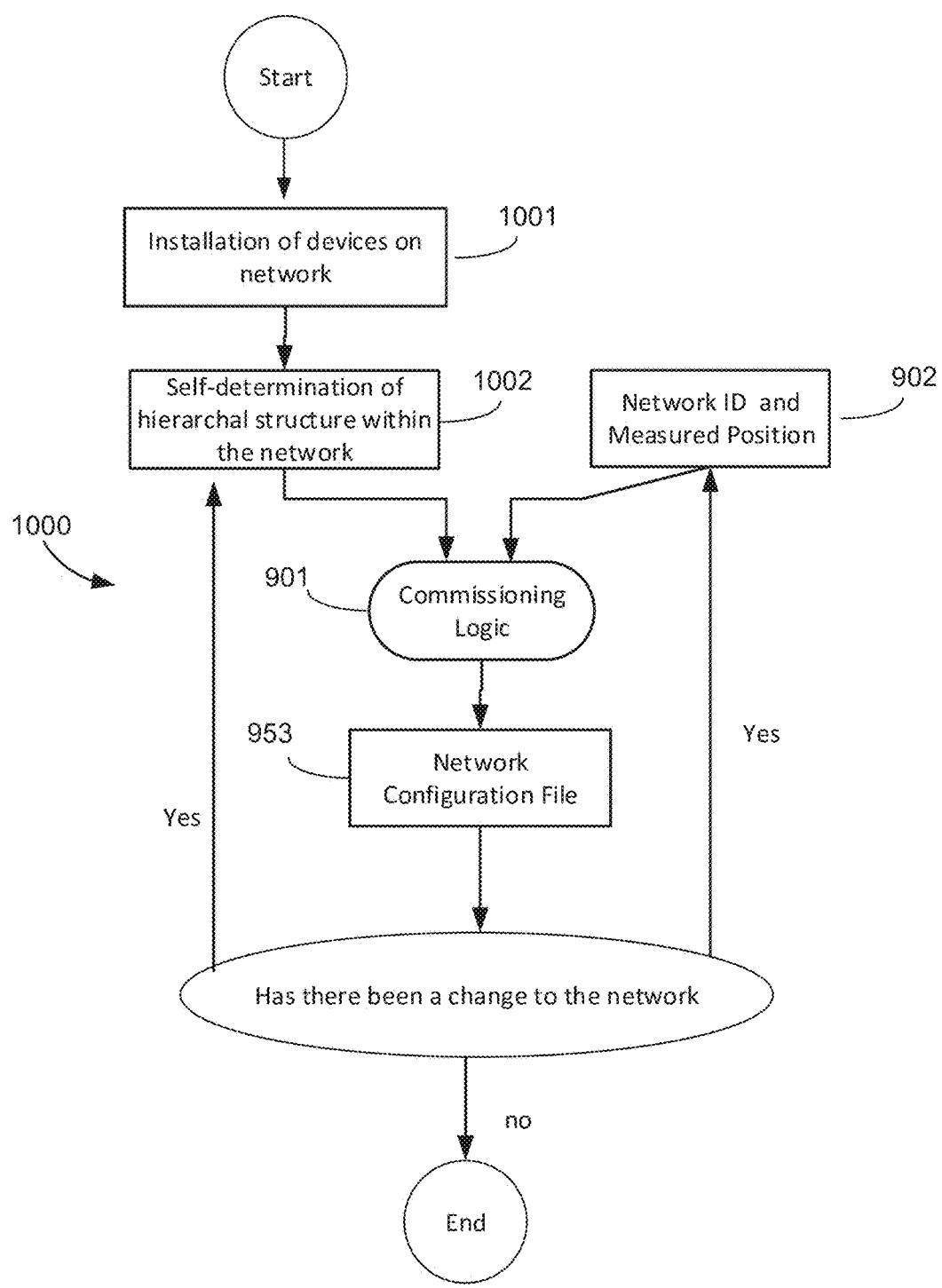
FIG. 10 shows the process in which commissioning logic may be used to generate a network configuration file without the need of an interconnect drawing.

In some embodiments commissioning logic may also generate the network topology portion of a network configuration file by a process 1000 as depicted in FIG. 10. In this embodiment, window devices are installed at a site 1001 and network components self-determine the hierarchical structure of the network by communicating with each other 1002. The hieratical structure of a network may be determined when each component self-reports to the network component above it reporting its network ID (or other ID) information as well the network ID (or other ID) information of any devices below it in the hierarchy. For example, an IGU may report to a WC, which may report to an NC, which may report to a MC. When this pattern in repeated for every component on the network, then the system hierarchy may be self-determined. In this case, a network avoids network topology errors that may easily be introduced by deviations from an interconnect drawing that occur during installation. This self-determined structure is then passed to commissioning logic 901 which may use the measured positions 902 of devices to when creating a network configuration file 953.

The instructions and logic for performing the steps shown in FIG. 8 or in other commissioning procedures described herein may be deployed on any suitable processing apparatus including any controller on the window network with sufficient memory and processing capability. Examples include master controllers, network controllers, and even window controllers. In other embodiments, the commissioning system executes on a dedicated administrative processing machine that performs only commissioning or related administrative functions, but communicates with the associated window network. In some embodiments, the commissioning system resides outside the building having the windows to be commissioned. For example, the commissioning system may reside in a switchable window network remote monitoring site, console, or any ancillary system such as a building lighting system, a BMS, a building thermostat system, e.g., NEST (Nest Labs of Palo Alto, Calif.), or the like. Examples of such systems are described in PCT Patent Application Publication No. 2016/094445, filed Dec. 8, 2015 and PCT Patent Application Publication No. 2015/134789, filed Mar. 5, 2015, each incorporated herein by reference in its entirety. In certain embodiments, the commissioning system executes in a shared computational resource such as a leased server farm or the cloud.

XII. Automated Commissioning: Tester Acquired Data

When a glazier installs IGUs as part of the electrochromic window network, the glazier may utilize an IGU tester and related hardware to collect data from every IGU that is installed. After each IGU is installed in a building, a glazier may test the freshly installed IGU to confirm that the IGU operates properly. Through this method, the electrochromic window network may be commissioned by processing physical location and other data acquired by the glazier utilizing an IGU tester during obligatory IGU installation work.

As stated, applications engineers or other professionals produce network configuration files with, e.g., computer-aided design software from interconnect drawings and location IDs of windows, physical locations of windows, and the location IDs of window controllers from architectural drawings. Network configuration files may then be combined with IGU tester acquired data to match physical locations and network address information to commission the electrochromic window network.

In some implementations, a tester may include an UWB module. These UWB modules may be DecaWave® radios (DWM1000) and may configure testers to act as tags or anchors that may be implemented for IGU location awareness and mapping used in commissioning with the network configuration files and interconnect drawings described above. Prior to installing the IGUs, a glazier, low voltage electrician, or other installation technician may begin the commissioning process by placing up to eight testers configured as anchors around a floor of a building, e.g., at the four corners of a building floor and four other locations as far away from each other as possible, optionally within line of sight of each other, to set up the coordinate system, e.g., the x-axis and y-axis, for that particular floor of the building. Alternative arrangements are also possible, such as always playing an anchor by IGUs located on the same place on different floors. Then, the glazier may proceed to utilize a tester configured as a tag to test each IGU as discussed above, e.g., coupling the pigtail of an IGU to the tester and running the test. A tester and IGU can communicate with each other via wireless communication, e.g., Bluetooth Smart® or low energy, during a test, so a glazier may ensure that each IGU test provides the most accurate location testing data by placing the tester against the IGU at the same location on or near the surface of each IGU, e.g., the bottom left corner of the lite, during testing, similar to the automated commissioning method described above for ultra-wideband protocol. This also provides some z-axis information as IGU dimensions read from IGU pigtails are factored into where on the IGU the tester was communicating with the IGU at. As the glazier tests each IGU, the tag-configured tester communicates wirelessly, e.g., via a communications module which may be a Bluetooth Smart® or low energy module, with a mobile device via a location engine mobile application. At every tested physical installation location of an IGU, the location engine mobile application captures and processes the position data of each IGU relative to the anchor-configured testers and relative to previously tested IGUs, while making use of information received from the IGU pigtail, e.g., IGU dimensions and LITE ID, to establish IGU location mapping on the floor. This process may be repeated to allow for the IGUs of an installation site to be accurately mapped per floor. To get an accurate mapping of an entire building layout, a glazier or other installation technician may move, e.g., two or more anchor-configured testers to the next floor up from the floor previously mapped. This allows the anchor-configured testers on different floors to communicate with one another to establish the z-axis of the building coordinate system, which was previously limited to the x and y-axis, with slight z-axis coverage from IGU dimensions and measurements, for each floor. This process may also be used to create wire-frame models of buildings. The network configuration file produced by applications engineering may then be combined with the tester data to match IGU location and network address information for commissioning.

When the mobile device establishes a cellular connection, the data obtained from testing the IGUs is transferred to a data center, e.g., the cloud, and processed during commissioning to associate the IGU location data with control applications. A field service engineer or technician may, during commissioning, match the tester data with or overlay the tester data upon, e.g., interconnect drawing data generated by applications engineering and have LITE IDs associated with IGU numbers, IGU locations, and window controllers. Once the balance of the system, or other hardware needed to operate and power the electrochromic window network, powers up, the CAN ID of an IGU associates with its LITE ID and thus the IGU location, e.g., x, y, and z-axis coordinates for each IGU, enabling the window control network to know which window or zone commands are being sent to.

In another embodiment of commissioning, IGUs and/or controllers may contain tags (e.g., RFID tags) that may be read by a by a scanner. During commissioning, an installer walks around and scans the devices on the window network (e.g., windows, controllers, and/or sensors) to determine a network address associated with the tag. An installer may then map the network address with a physical location using, e.g., a mobile device. In some cases, a tag may provide a device's network address to the scanner directly. E.g., a window controller may be equipped with an RFID tag that provides its network address. In other cases, a tag may provide another type of ID such as a LITE ID that may be used to determine a corresponding network ID of the device being scanned. E.g., a window may have a tag associated with a pigtail chip that provides a LITE ID. If a window controller was attached to a lite during manufacture or before installation of the IGU, then the LITE ID may be already mapped to corresponding network ID of the associated window controller.

Although the foregoing implementations have been described in some detail for purposes of clarity of understanding, it will be apparent that certain changes and modifications may be practiced within the scope of the appended claims. It should be noted that there are many alternative ways of implementing apparatuses of the present implementations. Accordingly, the present implementations are to be considered illustrative and not restrictive, and the implementations are not to be limited to the details given herein.

The invention claimed is:

1. A method of commissioning windows in a building, the method comprising:
   (a) identifying a plurality of networked devices for commissioning, wherein the plurality of networked devices comprise a first window located in the building, wherein identifying includes, for each of the plurality of networked devices, pairing a network ID with a respective physical location of a respective one of the plurality of networked devices and/or a respective electrical controller of one or more of the plurality of networked devices and pairing includes:
      (i) initiating a trigger, wherein the trigger is a test of an individual window or other networked device to determine whether the individual window or the other networked device responds to a command; and
      (ii) observing a response to the trigger; and
      (iii) determining, from the response, whether the pairing correctly matches the first network ID with the respective physical location of the first window.
2. The method of claim 1, wherein the trigger comprises sending instructions from a remote device to the first window to change a tint state of the first window.
3. The method of claim 2, wherein the tint state of the first window is one of two or more available tint states for the first window.
4. The method of claim 1, wherein the determining in (iii) comprises determining whether the first window is malfunctioning or misidentified.
5. The method of claim 2, wherein initiating the trigger comprises receiving information from a graphical user interface (GUI) on the remote device, wherein the GUI is configured to receive input identifying locations of the windows in the building.
6. The method of claim 1, wherein identifying networked devices for commissioning comprises determining an ID of the first window from installation data that specifies locations of windows in the building.
7. The method of claim 2, further comprising receiving user instructions from the remote device to group the first window with a second window of the building.
8. The method of claim 7, further comprising receiving instructions to change a tint state of the first window and a tint state of the second window.
9. The method of claim 1, wherein identifying networked devices for commissioning comprises receiving a prepared list of networked devices to be commissioned.
10. The method of claim 1, wherein identifying networked devices for commissioning comprises executing a discovery routine that discovers networked devices that have not yet been commissioned.
11. The method of claim 1, wherein identifying networked devices for commissioning comprises discovering each respective physical location within the building.
12. The method of claim 2, further comprising presenting, through a user interface of the remote device, notification of an event triggering commissioning.
13. The method of claim 2, wherein the remote device is handheld.
14. A method of commissioning windows in a building, the method comprising:
   (a) identifying a plurality of networked devices for commissioning, wherein each networked device has a network ID, and wherein the networked devices comprise a first window located in the building;
   (b) determining a respective physical location of each networked device; and
   (c) for each of the plurality of networked devices, pairing a respective network ID with the determined respective physical location and pairing the determined respective physical location with the network ID, wherein
   pairing includes observing a response of the first window to a trigger, the trigger being a test of an individual window or other networked device to determine whether the individual window or other networked device responds to a command.
15. The method of claim 14, wherein the respective physical location of each networked device is determined via analysis of wireless electromagnetic signals received or broadcast from the networked devices.
16. The method of claim 15, wherein the wireless electromagnetic signals comprise ultra-wideband signals.
17. The method of claim 15, wherein the determined location has an accuracy of less than about 10 cm.
18. The method of claim 15, wherein the method of commissioning is done automatically without requiring user input.
19. The method of claim 14, wherein the respective physical location is determined via observing a location of the trigger or a the response to the trigger.
20. A system of networked devices in a building, the system comprising:
   (a) one or more network controllers;
   (b) a plurality of window controllers, each configured to control a tint state for one or more optically switchable windows in a building, wherein each of the window controllers is in communication with one of the one or more network controllers; and
   (c) a master controller in communication with each of the network controllers, wherein the master controller is configured to:
   identify a plurality of networked devices for commissioning and, for each of the plurality of networked devices, make a pairing of a network ID with a respective physical location of a respective one of the plurality of networked devices and/or a respective electrical controller of one or more of the plurality of networked devices, wherein the plurality of networked devices comprise a first window controller in the building, the first window controller having a first network ID;
   initiate a trigger, wherein the trigger is a test of an individual window or other networked device to determine whether the individual window or the other networked device responds to a command; and
   determine, from the response, whether the pairing correctly matches the first network ID with the respective physical location of the first window controller.
21. The system of claim 20, wherein the trigger comprises sending instructions from a remote device to the first window controller to change a tint state of at least one of the one or more optically switchable windows.
22. The system of claim 21, wherein the master controller is further configured to receive user instructions from the remote device to group the first window controller with a second window controller of the building.
23. The system of claim 22, wherein the master controller is further configured to receive instructions to change a tint state of a first window associated with the first window controller and a tint state of a second window associated with the second window controller.

24. The system of claim 21, wherein the master controller is further configured to notify a user, through a user interface of the remote device, of an event triggering commissioning.

\* \* \* \* \*